(12) United States Patent
Hawthorne

(10) Patent No.: US 6,263,266 B1
(45) Date of Patent: Jul. 17, 2001

(54) METHOD OF OPTIMIZING TRAIN OPERATION AND TRAINING

(75) Inventor: Michael J. Hawthorne, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/525,523

(22) Filed: Mar. 15, 2000

Related U.S. Application Data

(60) Continuation-in-part of application No. 09/238,548, filed on Jan. 28, 1999, now abandoned, which is a division of application No. 09/151,286, filed on Sep. 11, 1998, now Pat. No. 6,144,901.

(51) Int. Cl.[7] .................................................. G06F 7/00
(52) U.S. Cl. .............................. 701/19; 701/20; 246/1 R; 434/29
(58) Field of Search ........................ 701/19, 20; 246/1 R, 246/2 R; 434/29, 62, 63, 64, 65, 69; 273/442

(56) References Cited

U.S. PATENT DOCUMENTS

| | | | |
|---|---|---|---|
| 3,885,324 | * 5/1975 | Davenport et al. | 434/66 |
| 4,041,283 | 8/1977 | Mosier | 235/150.2 |
| 4,042,810 | 8/1977 | Mosher | 235/150.2 |
| 4,181,943 | 1/1980 | Mercer, Sr. et al. | 701/70 |
| 4,602,335 | 7/1986 | Perlmutter | 701/70 |
| 4,750,888 | * 6/1988 | Allard et al. | 434/69 |
| 5,354,202 | * 10/1994 | Moncrief et al. | 434/69 |
| 5,744,707 | 4/1998 | Kull | 73/121 |
| 5,758,299 | 5/1998 | Sandborg et al. | 701/29 |

FOREIGN PATENT DOCUMENTS

| | | |
|---|---|---|
| 196 45 426 A1 | 5/1997 | (DE) . |
| 114 633 A1 | 8/1984 | (EP) . |
| 257 662 A2 | 3/1988 | (EP) . |
| 539 885 A2 | 5/1993 | (EP) . |
| 755 840 A1 | 1/1997 | (EP) . |
| 2188 464 A | 9/1987 | (GB) . |

OTHER PUBLICATIONS

Database WPI, Section PQ, Week 9751, Derwent Publications Ltd., London, GB; Class Q18 AN 97–550428.

* cited by examiner

Primary Examiner—William A. Cuchlinski, Jr.
Assistant Examiner—Yonel Beaulieu
(74) Attorney, Agent, or Firm—Barnes & Thornburg

(57) ABSTRACT

A method of optimizing train operation and training in a moving train includes determining the train's conditions and calculating a desired response to the present conditions of the train to achieve a goal. The engineer's response is determined and the train's conditions resulting from the engineer's response is determined and may be displayed on the train. The desired response, for example brake and propulsion settings, may be displayed after determining the engineer's response. The engineer is qualified from the comparison of the engineer's response to the desired response to the condition. Access to the locomotive controls may be controlled using a user identification and determining the qualification level of the user. The qualification level can be updated based on the training session.

27 Claims, 15 Drawing Sheets

METHOD OF OPTIMIZING TRAIN OPERATION AND TRAINING

CROSS-REFERENCE

This is a continuation-in-part of U.S. patent application Ser. No. 09/238,548 filed Jan. 28, 1999, now abandoned which is a divisional of U.S. patent application Ser. No. 09/151,286 filed Sep. 11, 1998 now U.S., Pat. No. 6,144, 901.

The present invention relates generally to locomotive display and more specifically to a method of optimizing train operations and training and its use with, for example, a Locomotive Engineers Assist Display and Event Recorder (LEADER).

The LEADER System is a real-time, enhanced version of the Train Dynamics Analyzer (TDA), a long standing Locomotive Engineer training tool offered by the Train Dynamics Services Group of New York Air Brake. LEADER has the ability to display a real-time or "live" representation of a train on the current track, the trackage ahead, the dynamic interaction of the cars and locomotives (both head end and remote), and the current state of the pneumatic brake system. As a tool for the Locomotive Engineer, LEADER will allow insight into the effect of throttle changes and brake applications throughout the train providing feedback and information to the Locomotive Engineer not currently available. The information LEADER offers provides an opportunity for both safer and more efficient train handling leading to enormous potential economic benefits.

The LEADER System has all the necessary information to predict the future state of the train given a range of future command changes (what if scenarios). With this ability, LEADER can assist the railroads in identifying and implementing a desired operating goal; minimize time to destination, maximize fuel efficiency, minimize in train forces, (etc.) or a weighted combination thereof. LEADER will perform calculations based on the operational goal and the current state of the train to make recommendations to the Locomotive Crew on what operating changes will best achieve these goals.

The TDA functionality was enhanced to assist in training Locomotive Engineer how to better handle their trains. Designs of simulators with math models are shown in U.S. Pat. Nos. 4,041,283; 4,827,438 and 4,853,883. Further capability was added to investigate accidents by playing the event recorder data through the TDA, monitoring critical physical parameters. Through the years data was collected from instrumented trains and laboratory experiments, allowing the models used by the TDA to be refined. On board data collection for off-loading is shown in U.S. Pat. Nos. 4,561, 057 and 4,794,548.

As more Locomotive Engineers became familiar with the TDA display through training sessions, it became apparent that a real time version of the TDA in the cab of a locomotive would offer substantial benefits in improved train handling. Improved train handling would in turn foster safety and economic benefits. Earlier designs for on board computer controllers is shown in U.S. Pat. No. 4,042,810 with a description of math models.

The LEADER system provides safe and effective control of a train through display or control of the dynamically changing parameters. It accurately provides train speed within designated speed limits. It maintains in-train coupling forces with safe limits to prevent train break-in-twos. It maintains safe levels of lateral forces between the wheels and the rails of all cars to prevent cars from departing from the track and derailing. It provides control of slack action for both draft and between cars to reduce damage to valuable lading and to prevent potential train separation or break-in-twos. It maintains train stop and slow downs to prevent the train from entering unauthorized territories that could cause accidents with other train traffic. It determines the optimum locomotive throttle setting and train brake application to minimize fuel consumption and wear of brake shoes and wheels. It monitors total locomotive performance, train brake performance and it provides advisement if performance is faulty. It forecasts the estimate time of arrival of train to various switch points, signals locations or final destinations to advise the engineer and rail traffic control centers. It records various key data for later downloaded analysis for operational studies and accident investigations as well as engineer qualifications.

A method of optimizing train operation includes determining conditions of location, track profile and train forces of the train. Next, a set of preliminary train restraint operating parameters are determined from the determined conditions. Also, at least one of a set of preliminary train optimizable operating parameters to minimize train forces, to maximize fuel efficiency and to minimize time to destination is determined. The determined set of preliminary train operating parameters are weighted and combined. Optimized train operating parameters are determined from the weighted and combined preliminary train operating parameters.

The determination of whether optimization should be performed is made from train location track and profile. This includes determining the location of train with respect to one or more of hill, valley, curve, signal and siding.

Determining optimized operating parameters includes determining dynamic and fluid braking. The fluid braking is determined individually for each locomotive and car in the train which can be individually controlled. The dynamic and fluid braking for each locomotive will be determined for each locomotive individually. Dynamic and fluid braking may be one of the sets of the preliminary train optimizable operating parameters and will be weighed and combined with the other preliminary train operating parameters. The weighing of the dynamic and fluid braking is a function of location on the track profile. The train operating parameters include one or more of train fluid braking, locomotive fluid braking, locomotive dynamic braking and locomotive propulsion. One of the train optimized operating parameters is shutting down or restarting the propulsion of individual locomotives. The optimized operating parameters may be displayed and/or the train controlled to the determined optimizing parameters.

Determining the preliminary train restraint operating parameters includes one or more of speed limits, slow orders, speed restriction zones, meets and passes, track occupancy permits, general operating bulletins, drawbar limits and slack action limits. The preliminary train optimizable parameters are determined using the operational restraints. The method also includes determining train characteristics. The train characteristics for each car includes one or more of length, weight, position of the train, braking equipment description, types of bearings and wind drag areas. The characteristics for each locomotive includes one or more of length, weight, position of the train, traction performance, dynamic braking performance, fuel consumption as it relates to power control settings and locomotive speeds.

The determination of train forces includes determining forces experienced by and throughout the train for the ensuing track. This includes determining coupler forces and slack action throughout the train. The determination of preliminary train restraint operating parameters includes determining preliminary train operating parameters to maintain coupler forces below a set limit. If slack action has been determined, the optimized train operating parameters are determined to achieve zero acceleration within the train. If slack action and coupler forces exceed predetermined limits, the operator is notified. If the operator does not take appropriate action, the train is controlled to the determined operating parameters. The determining of forces includes determining at least one of steady state draft and buff, transit draft and buff, slack action and lateral over vertical force ratio.

The determining forces also includes determining forces exerted by the grade and rolling resistance over the ensuing track. The preliminary train optimizable operating parameters are determined to maintain grade from the determined rolling resistance and force exerted by a grade. A preliminary train optimizable parameters are determined to stop at a minimum distance from the determined rolling resistance force and force exerted by the grade. The method of determining the optimizable operating parameters to stop at minimum distance is repeated until the train has stopped. The preliminary train restraint and optimizable operating parameters are determined to adhere to posted speed restrictions.

The method of training a locomotive engineer in a moving train includes determining the actual conditions throughout the train and determining a desired response to the present conditions of the train to achieve a goal. The engineer's response is determined and the actual conditions throughout the train resulting from the engineer's response is determined and displayed on the train. A goal or desired response is determined by the training authority by selecting a combination of weighing or emphasis factors for maximizing fuel efficiency, minimizing time to destination and minimizing in-train forces. The desired response may be displayed after determining the engineer's response. The desired response includes brake and propulsion settings. The display can be changed to reflect the condition resulting from the suggested response.

The engineer's response is recorded as it relates to the displayed condition. The engineer's response is compared to the desired response. The engineer is qualified from the comparison of the engineer's response to the desired response to the condition. The response of the train to the engineer's response as it relates to the displayed condition is also recorded. The observations of a trainer on the train are also recorded.

Another method of training a locomotive engineer in a moving train includes determining the actual conditions throughout the train. Brake and propulsion settings to achieve a goal are calculated and displayed. The calculated brake and propulsion settings are displayed to the engineer and/or trainer on the train. The training authority forms a goal by selecting a combination of weighting or emphasis factors for maximizing fuel efficiency, minimizing time to destination and minimizing in-train forces. The engineer is qualified from a comparison of actual throttle and brake settings to a calculated set of recommended brake and throttle settings found to achieve the selected goal representing safe and efficient train-handling practices. The engineer may also be judged on when the whistle and bell were used in relation to crossings and whether speed was prudent for the operation of the train given current and anticipated circumstances. The train's present conditions throughout the train may be displayed as well as a change of the conditions throughout the train if the recommended throttle and brake settings would have been set. The determining and displaying may be performed on a portable computer on the train or a pre-existing computer on the train.

A method of qualifying a locomotive engineer in a moving train includes recording on the moving train in a data storage the actual conditions throughout the train and the actual throttle and brake settings as a function of time. Also the observations of a trainer on the train is recorded as a function of time in the data storage. Throttle and brake settings based on the conditions of the train to achieve a goal are determined as a function of time and the engineer is qualified from a comparison of the actual throttle and brake settings to the determined throttle and brake settings determined by a railroad to represent safe and efficient train handling as a function of time. The determination of throttle and brake settings to achieve a goal may be performed on or off the train. The data storage maybe an event recorder already on the train or a Leader system.

A portable training system for training a locomotive engineer in a moving train includes an input for receiving information of the actual conditions of the train and a program for calculating throttle and brake settings based on the present actual conditions of the train to achieve a goal. A display displays on the train the desired throttle and brake settings. The display may be part of the portable system or mounted to the train and the portable system has an output coupled to the display.

The method of training would also include determining the qualification level of the engineer prior to training from the engineer's inputs. The qualification level of the engineer and an engineer identification may be inputted by using an encoded device. The engineer is qualified based on the determined response and the qualification level is updated based on the determined qualification. Access to the locomotive controls may also be controlled using a user identification and determining the qualification level of the user. The system is enabled if the qualification level of the user meets the locomotive requirements. The user identification and qualification levels may be inputted by the previously discussed encoded device. The control system, for example, the display, may be customized using the user's identification and/or qualification level.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
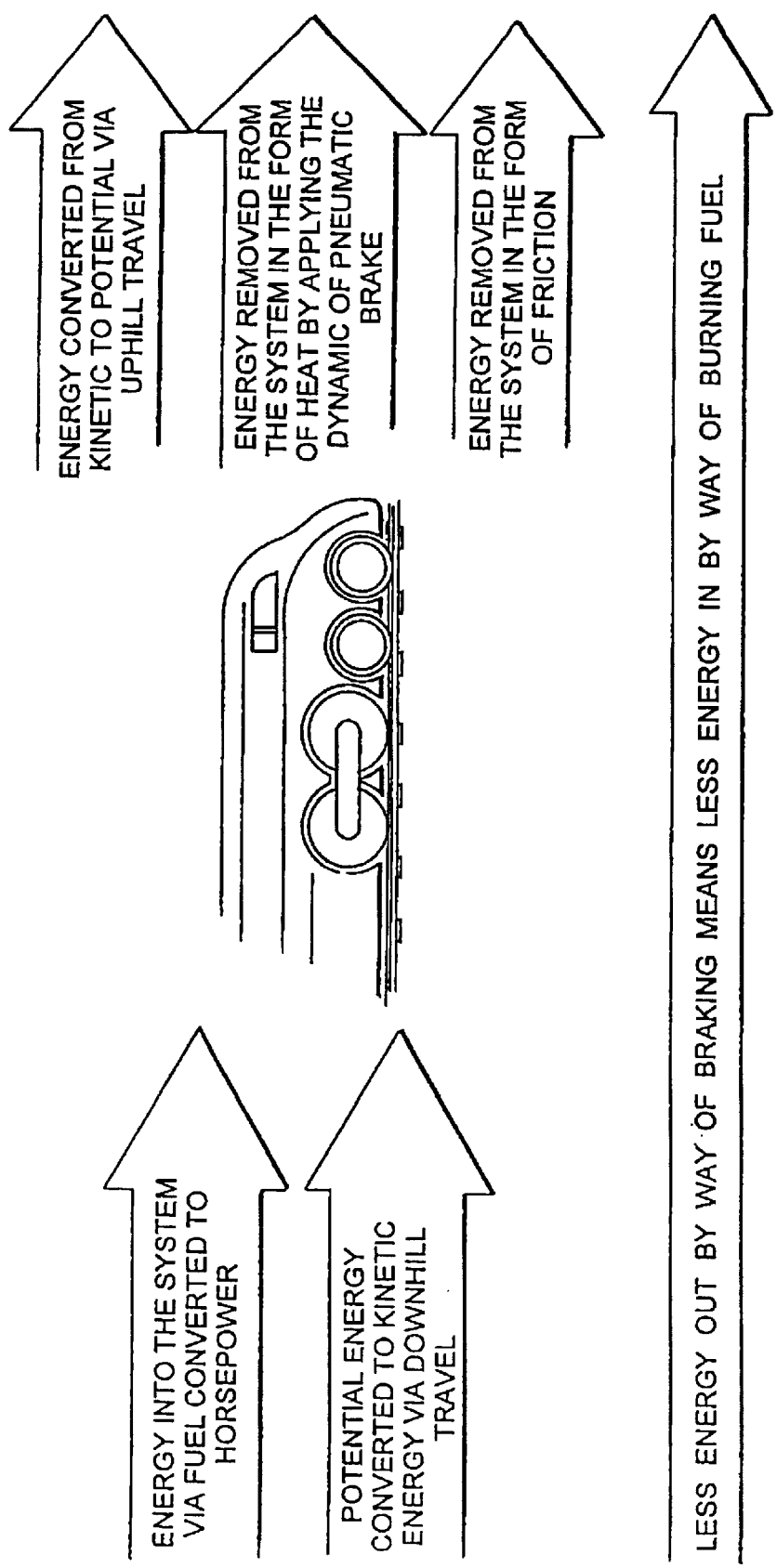
FIG. 1 is a diagrammatic view of the energy balance system according to the principles of the present invention.

LEADER operates on the principle of conservation of energy, kinetic and potential as illustrated in FIG. 1. Some events increase the amount of kinetic or potential energy in the system, while others reduce it. Burning fuel converts matter to energy (motion via horsepower and heat), while braking converts kinetic energy into heat, slowing the train. Energy changes state but, the total sum of energy in the system must be a constant. A train in motion is constantly converting fuel to energy, converting kinetic energy into potential energy traveling uphill against gravity, converting potential energy into kinetic energy traveling downhill, and removing kinetic energy in the form of heat from the friction and dynamic brake systems.

Math models of the LEADER System, monitors parameters and performs calculations based on the current energy state of the train to create a real-time display of train dynamics. The power of LEADER resides in its ability to provide information allowing the crew to better control the train, minimizing loss of energy. Loss of energy via overbraking represents fuel unnecessarily consumed. Energy imparted to the cargo of the train represents potential damage to lading, equipment and rail. Both phenomena are undesirable and addressable with LEADER.

Figure 2:
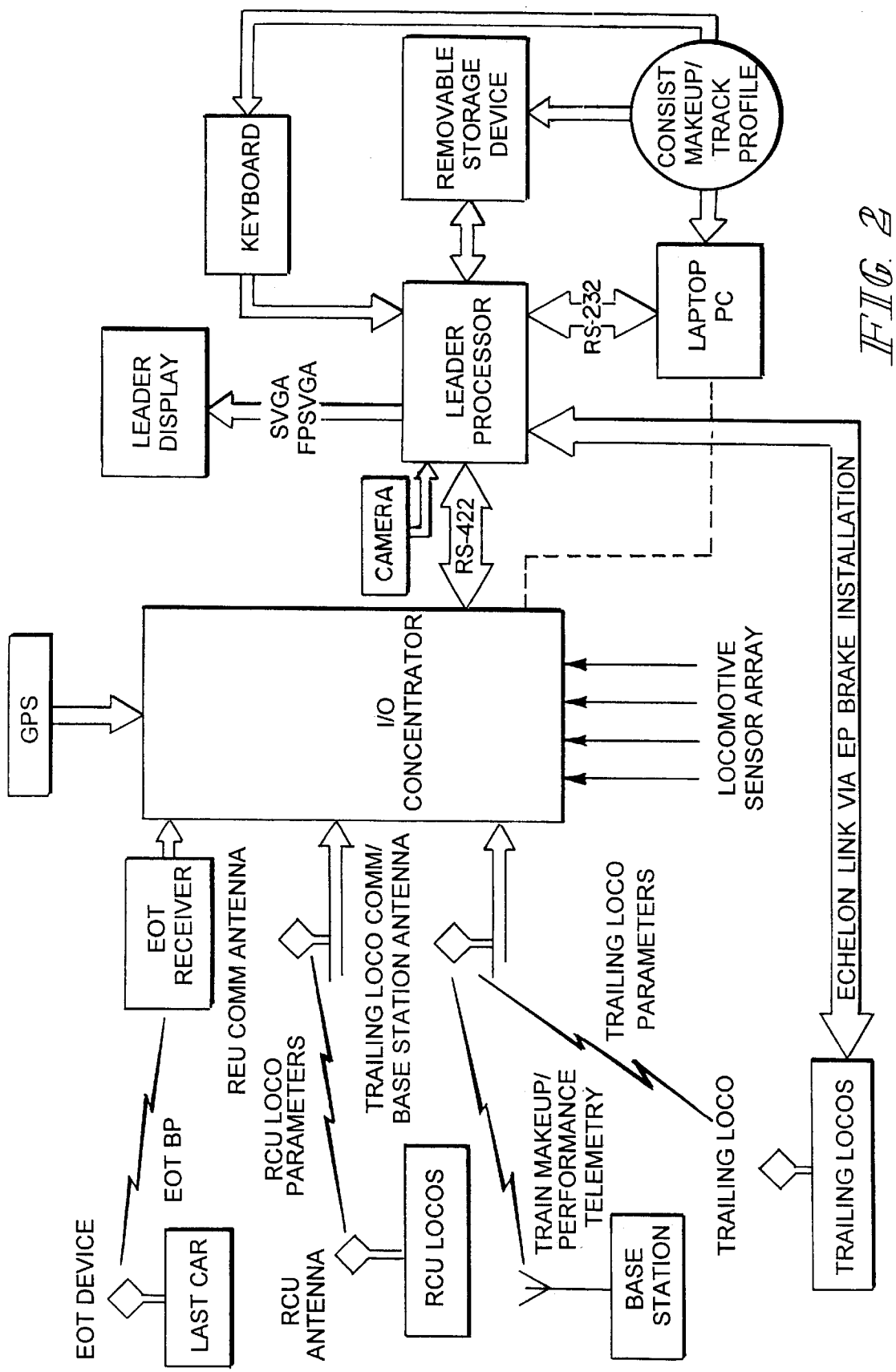
FIG. 2 is a block diagram of the system components of a locomotive assist display and event recorder according to the principles of the present invention.
Figure 5:
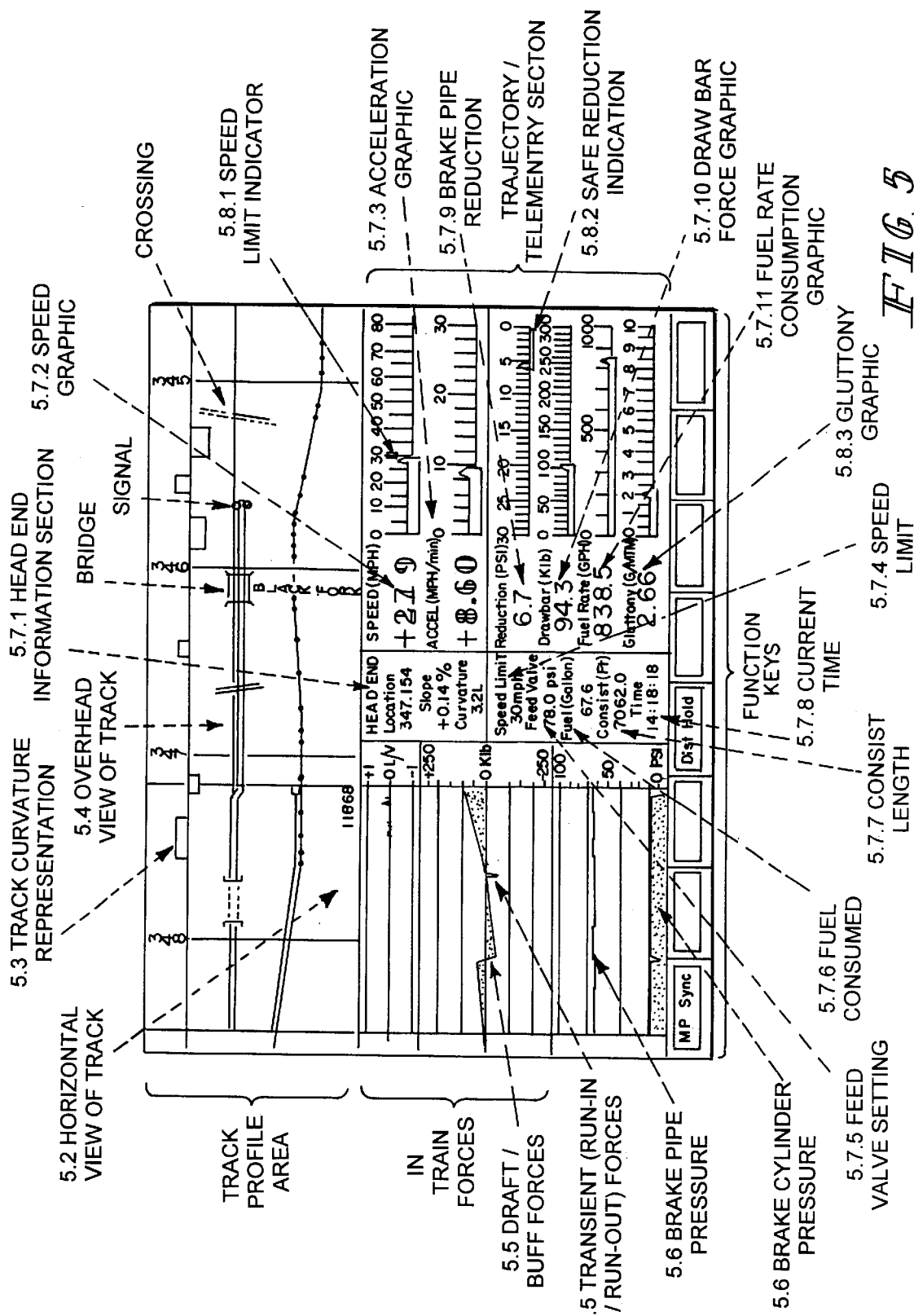
FIG. 5 is a LEADER display incorporating the principles of the present invention.

The LEADER system is comprised of a number of subsystems each with specific duties. FIG. 2 shows a generic LEADER architecture. The user interface of the LEADER System is the real-time display which shows a graphical and numerical representation of the current state of the train as shown in FIG. 5. Radio communication is established between the lead locomotive, the trailing locomotives in the lead consist, and locomotives in the remote consist to report the necessary parameters from each of these locomotives necessary to perform LEADER Calculations. Consist information is entered via the key pad on the real-time display, a wired communication source (laptop PC or removable storage device) or via wayside radio communication. Position is determined from wheel movement sensors and a Global Positioning System (GPS). The Input/Output (I/O) Concentrator gathers all of the various locomotive parameters necessary for LEADER algorithm calculations and reports the information to the LEADER Computer. The LEADER Processor, a high throughput capacity computer platform using a Real Time Operating System (RTOS), then performs the calculations required by the LEADER algorithms and the real-time display is updated. All of these sub-systems combine to form the LEADER System.

Each locomotive in a LEADER train will require at a minimum, the I/O Concentrator with communication capability to the head end. A LEADER Processor and Display are only required for the lead locomotive. The decision to equip all locomotives with a full LEADER installation (Processor, Display in addition to the I/O Concentrator) should be based on the Railroads ability to permanently designate a locomotive as lead or trail in its duties.

The development of LEADER began over 20 years ago with early efforts to create the Train Dynamics Analyzer (TDA), a computer math model used to predict in-train forces. The train dynamic modeling techniques and algorithms embodied in the TDA are described in U.S. Pat. No. 4,041,283.

LEADER provides a number of unique features that are available due to LEADER's comprehensive knowledge of the state of the train. Many of these features allow the Railroad to convey and enforce operating policies by programming limits into the LEADER System such that when the limits are exceeded, LEADER will audibly and/or visibly alert the crew to the situation.

FIG. 5 shows a "frozen" LEADER Display. Each LEADER feature is identified by a block which points to the appropriate screen location. The sections following use the same paragraph number as the identification block detail the operation of each feature.

The LEADER Display shown in FIG. 5 represents one particular configuration for the display of LEADER information. The display format can be customized on customer request by adding information, removing information, changing the color scheme, rearranging the position of the sections of information, and/or varying the size of any particular graphic.

In the following descriptions of features on the LEADER Display the term function will be used to describe the plot of the magnitude of a particular parameter across the length of the train varying with time.

5.1 Track Profile

The top portion of the LEADER Display shows the track profile in three views. The train consist is represented with different colored blocks for the locomotive units and for the cars. The length of the displayed train is proportional to the length of the actual train. Milepost marks are represented by lines running vertically through the track profile portion of the display.

5.2 Horizontal View of Track

The horizontal view of the track profile shows the grade on which the train is currently positioned and the grade of the track profile for a number of miles ahead. The Horizontal View of the track profile will show the position of the entire train on the track, both current location and geographic shape (uphill or downhill) as a vertical slice of the track profile in real-time.

5.3 Track Curvature Representation

The top graphic of the track profile section is made up of blocks that represent track curvature. A block above the dividing line represents a curve to the right, a block below the dividing line represents a curve to the left. The longer the block the longer the curve. The higher the block the more severe the curve.

5.4 Overhead View/Supplemental Information

Just above the horizontal view is the overhead view. This view incorporates symbols to represent track structures such as crossings, signals, overpasses, underpasses, and sidings.

5.5 In-Train Forces

Directly below the train represented on the LEADER display is the portion of the screen dedicated to showing in-train forces. All in-train forces are displayed as a graphic that maps to each car in the train. Follow any point on any of the force functions straight up the display and it will intersect with a point on the train where that particular level of force is currently present. Three types of forces are represented on two different graphics. The two graphics can be identified as the draft/buff magnitude force functions and the Lateral divided by Vertical (L/V) force ratio function.

The draft/buff force graphic represents draft forces as a function above the 0 kilo-pound line and buff forces as a function below the 0 kilo-pound line. Draft and buff forces can be divided into two categories, steady state and transient. Steady state forces are shown, in general, by a smooth, relatively slow changing function. Transient draft and buff forces (run-in/run-out or slack induced forces) are shown by "spikes" of force that travel through the train. LEADER accurately calculates and displays both. Slack induced forces represent momentum transfers between the cars resulting in potential lading and car damage.

The Lateral over Vertical (L/V) force ratio graphic is shown above the draft/buff force graphic. L/V forces appear in cars as they traverse curves in the track.

5.6 Brake Pipe Pressure/Brake Cylinder Pressures

Directly below the force graphics are two functions that represent brake pipe pressure throughout the train and brake cylinder pressure throughout the train. Again, these functions map to a location in the train representation directly above. Because the functions are real-time representations of the brake system, it is possible to monitor a brake application or release as it travels through the entire train.

5.7 Trajectory/Telemetry Information

The lower right and lower center sections of the screen have real time trajectory and status information displayed in both digital and analog bar graph format. The following list contains the parameters currently shown on the LEADER Display: Sections are numbered to match the identification blocks of FIG. 5.

5.7.1 Head End Information

Location is a digital representation of mile market location of the head end locomotive. Slope is the grade of the track at the location of the head end locomotive. Curvature is the degree of curvature of the track at the location of the head end locomotive.

5.7.2 Speed is shown as a digital read out followed by an analog bar graph representing the speed of the head end locomotive at each instant in time. The bar graph will turn from a normal color of green to red if the speed limit is exceeded.

5.7.3 Acceleration is shown as a digital read out followed by an analog bar graph representing the acceleration of the head end locomotive at each instant in time.

5.7.4 Current Speed Limit is shown as a digital read out of the speed limit for the current position of the head end locomotive.

5.7.5 Feed Valve Setting is the pressure at which the feed valve is set, displayed in pounds per square inch (psi).

5.7.6 Fuel is the amount of fuel consumed since the counter was last reset.

5.7.7 Consist Length is a digital read out of the length of consist shown in feet.

5.7.8 Time is the digital read out of the current time.

5.7.9 Brake Pipe Reduction (or EP Brake Command) This graphic takes on two roles; one for conventional pneumatic brake equipped trains and one for EP Brake equipped trains.

In Conventional, the graphic is a digital read out followed by an analog bar graph representing the brake pipe pressure reduction at the head end locomotive at each instant in time. The LEADER system has the capability to support trains equipped with EP Brake Systems rather than conventional displacement valves. In an EP equipped train the graphic is a digital read out followed by an analog bar graph representing the percent of brake commanded to the EP System.

5.7.10 Draw Bar Forces is a digital read out followed by an analog bar graph representing the instantaneous locomotive draw bar force.

5.7.11 Fuel Consumption Rate is a digital read out followed by an analog bar graph representing the instantaneous fuel consumption rate of the entire train shown in Gallons Per Hour (GPH).

5.8.1 Excessive Speed Warning is an audio and/or visual warning that will appear on the LEADER Display when the speed of the locomotive exceeds the speed limit for the current track location. The speed restriction for the track can be modified to reflect slow orders for a section of trackage. A mark is shown on the speed indication graphic that represents the current speed limit.

5.8.2 Minimum Safe Pneumatic Brake Reduction is of interest for safe train operation. As brake applications are applied and released the charge state of the pneumatic brake system can become such that an undesired release of brakes will occur if the next brake application requested is not deep enough. LEADER will calculate the safe brake application level and visually display a target on the Brake Reduction bar graph. If the brake application requested is not deep enough, a visual warning will be posted by the LEADER display.

5.8.3 Gluttony is a measure of how the train is being moved with regards to fuel efficiency. Gluttony is calculated and displayed in gallons/thousand-ton-miles.

The LEADER display is equipped with eight function keys at the bottom of the display. The definition of each function key is shown in the representation of the key on the LCD panel directly above it. The function keys allow user input to the system, accessing various setup and configuration menus and querying information from the LEADER system.

As illustrated in FIG. 2, a camera is shown connected to the LEADER processor. The camera is mounted to view the conditions seen down track from the front of the train. This information can be displayed in lieu of the LEADER display of FIG. 5 or as a picture in picture with the results of the LEADER display. The picture in picture of the actual track may be moved anywhere within the LEADER screen of FIG. 5 obscuring selected information from the LEADER screen. This will allow the engineer to view simultaneously the actual condition of the track as well as the information on the LEADER screen.

LEADER is capable of three operating modes, each building on the previous mode. The three modes advance LEADER from a real time display passively providing information to the locomotive engineer (information only mode) to a LEADER system that will suggestions to the locomotive engineer on how to better handle the train (driver assist mode) and finally to a control system that is capable of issuing commands to optimally control the locomotive (cruse control mode).

In the information only mode, the locomotive engineer makes all of the decisions and solely activates the various control systems in a manual mode. The LEADER provides information to the engineer that is not currently available to him to use to manage various locomotive control systems. In driver assist mode, LEADER determines and displays the optimum locomotive power dynamic brake throttle setting and the locomotive and car brake control settings. These settings are determined for the head end locomotives and the remotely controlled locomotives. These recommendations are desired settings displayed to the locomotive engineer who can then elect to manually move the various controls to achieve these settings. In the cruise control mode, leader derived settings are used to automatically control the locomotive power and braking systems, the train brake system of each car and ancillary systems which effect train movement. The locomotive engineer services an operational supervisor with the ability to manually override the cruise control. Cruise control can also be effectuated by communication links between the leader and the railroad central traffic control center.

LEADER would receive and activate a variety of commands received from the central traffic control center. This received information would include impeding slow orders, speed limit changes, aspects of approaching signals, etc. LEADER would provide status updates to the control center, including current train speed, current track location, detected faults or equipment malfunctions, estimated time of arrival, etc. The traffic control can use this information to manage the complete safe and effective movement of train traffic under its control.

Figure 6:
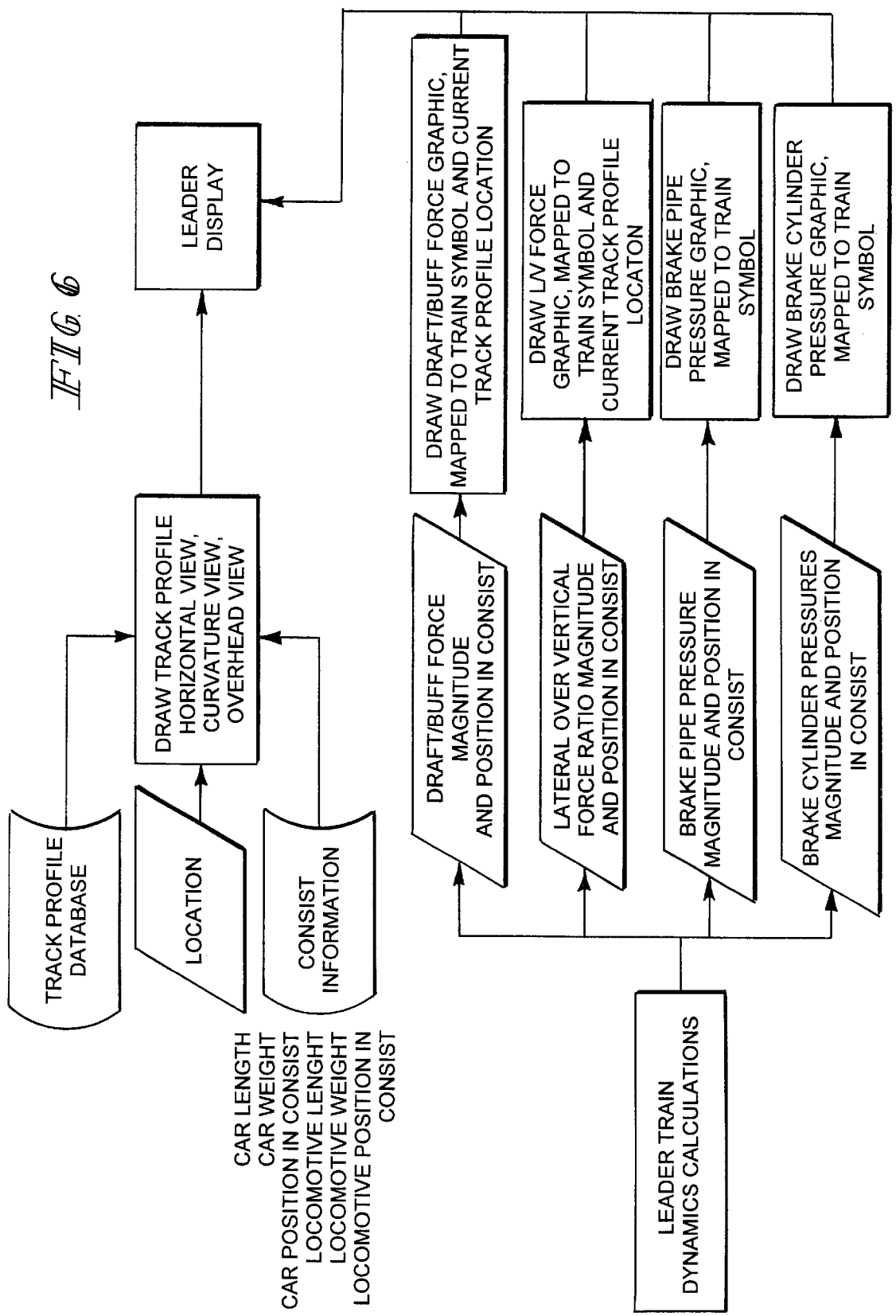
FIG. 6 is a block diagram with flow of information from the train to the display incorporating the principles of the present invention.

The display of FIG. 5 is produced by the flow chart of FIG. 6. The track profile data bases include track profile or topology including grades, curves, mile posts, town names, absolute latitude and longitude coordinates, signal locations and other various track structures. Besides the physical characteristics of the track profile, also the condition of upcoming signals, slow orders, speed limits and location of speed restricting zones are taken into account. The LEADER system includes communication capability between the locomotive and central dispatcher such that new orders can be loaded into the system in real time. THE LEADER system also include multiple distance counters to aid the locomotive engineer with navigating various speed restrictions zones. The LEADER has the capability to start, stop, reset and alert the crew upon arbitrary condition of multiple counters shown on the LEADER display. Thus, depending upon the length of the train, the train may be in multiple zones at a time.

Various physical conditions and train characteristics are need for the methods to be discussed below. The consist information or train characteristics includes car length, car weight, car position in the consist, braking equipment description, types of bearings, wind drag areas. It also includes information on the locomotive including locomotive length, weight and position of the consist, traction performance, dynamic braking performance, fuel consumption as related to power control settings and locomotive speeds.

The track profile data base and the consist information can be loaded externally by the engineer or communication links with the railroad central traffic control center. Similarly, the information on the consist may be derived automatically from individual controllers on the locomotives on the cars during power up as described in U.S. patent applications Ser. No. 08/837,113 filed Apr. 14, 1997 and Ser. No. 08/689,813 filed Aug. 14, 1996. Other information that may be loaded would include operational constraints for exceptional speed limits and special slow orders, speed restriction zones, meets and passes, track occupancy permits, general operating bulletins, upcoming signal designations, desired time of arrival and final destination location and limit of authority or track locations the train move to without the possibility of interference with the movement of the trains in the area.

The track profile data base, location and consist information are used to draw the track profile in the horizontal view, curvature view and overhead view and provided to the leader display.

The leader train dynamic's calculations uses a combination of instrumented measurements at the locomotive and if available from the cars and a computer calculation based on the fundamental laws of physics, engineering mechanics along with various empirical derivations. These measurements and calculations are used to facilitate the estimated required feedbacks. The measurements include throttle and/or dynamic brake settings at the locomotive, control pressures of various locomotive air brake control systems, and locomotive speed and increment wheel rotation. It also includes end of train brake control pressures and brake pressures to the individual cars available. Power produced and/or anticipated within the locomotives traction system and locomotive wheel slip. Activation of the locomotive sanders and whistle and or bells. The absolute track location and time of day are also inputs. This is in addition to the consist information and track profile previously described.

From this information, Leader calculates the steady state and transient draft/buff force magnitude and its position of the consist, lateral over vertical force ratio magnitude and position in the consist, brake pressure magnitude and position in the consist and brake cylinder pressure magnitude and positions in the consist. These four parameters are then mapped to the train symbols and current track profile locations and provided to the leader display.

Figure 7:
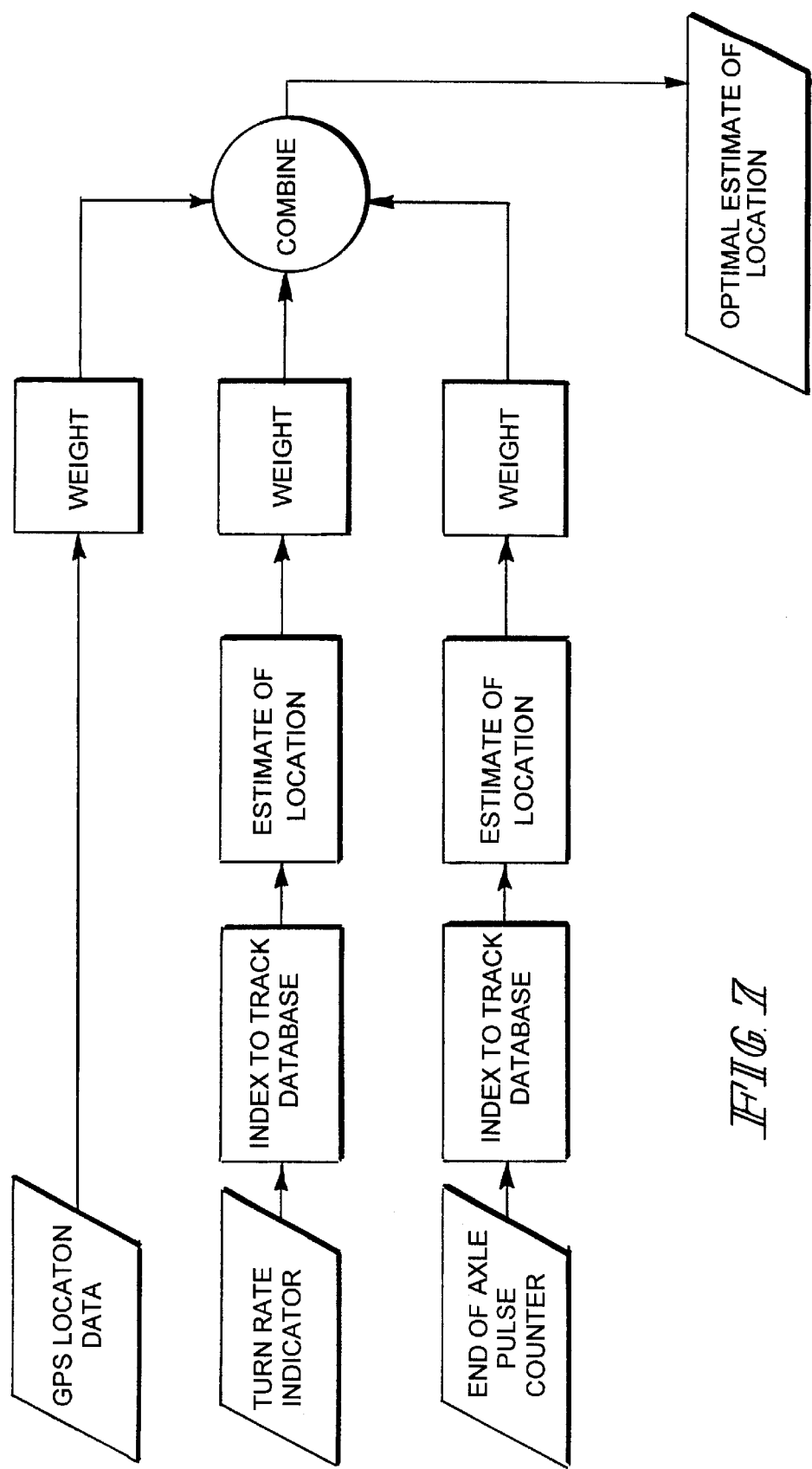
FIG. 7 is a flow chart for location and determination according to the principles of the present invention.

A flow chart for determining the location is illustrated in FIG. 7. Three different sources of information are derived, weighted and combined as an estimation of location. A first source for information is transmitted to the train. This is available from geographical positions system (GPS) which is used to detect the precise latitude and longitude of the head of the train. Another commercially available system uses transponders buried at spaced intervals under the rail. The locomotive equipped with a transceiver activates transponders as they pass over them. The transponder then transmits an encoded message that, when deciphered, provides track location. As another alternative, the train engineer can enter mile post signs which would then be compared against the track data base to determine location.

The flow chart of FIG. 7 also indicates two incremental methods of estimating location. A turn rate indicator provides a signal which is used to index against the track data base to produce an estimate of the location. Another is an end of axle pulse counter which detects incremental distance travel by the locomotive and is used to index the track data base to an estimate location. The turn rate indicator and the end of axle pulse counter will operate to an increment from the previously measured position. All three of the estimated locations are then weighted and combined to produce the ultimate estimate of location to be used in the display and various calculations based on track profile.

The LEADER also has the capability of determining whether its calculations are inaccurate. For example, if there is error in actual distance traveled versus the calculated distance traveled, this may be brought to the attention of the operator. This allows the operator to change the weighting functions if desired in the algorithm. These errors in the algorithms may be to faulty measurements, wrong consist information, failures in the car brake systems and/or failures in the propulsion system. Even without the ability to identify the specific source of the error, at least notification that the error does exist will allow the operator and the system to make more intelligent decisions.

The LEADER integrates with electropneumatic (EP) brake systems to provide braking on a car by car basis. This can be used to maximize fuel efficiency, minimizes in-train forces, and/or minimize the time of the destination. By combining knowledge of the position and state of the train, the control of the individual brakes further improves braking performance. For example, the EP brake controllers on each car can be commanded to apply brakes on the cars forward of a certain point as the train crests the hill and not apply the brakes on the cars which are below the crest of the hill. This eliminates the cars on the uphill side from being dragged with their brakes on until they crest the hill.

Figure 3:
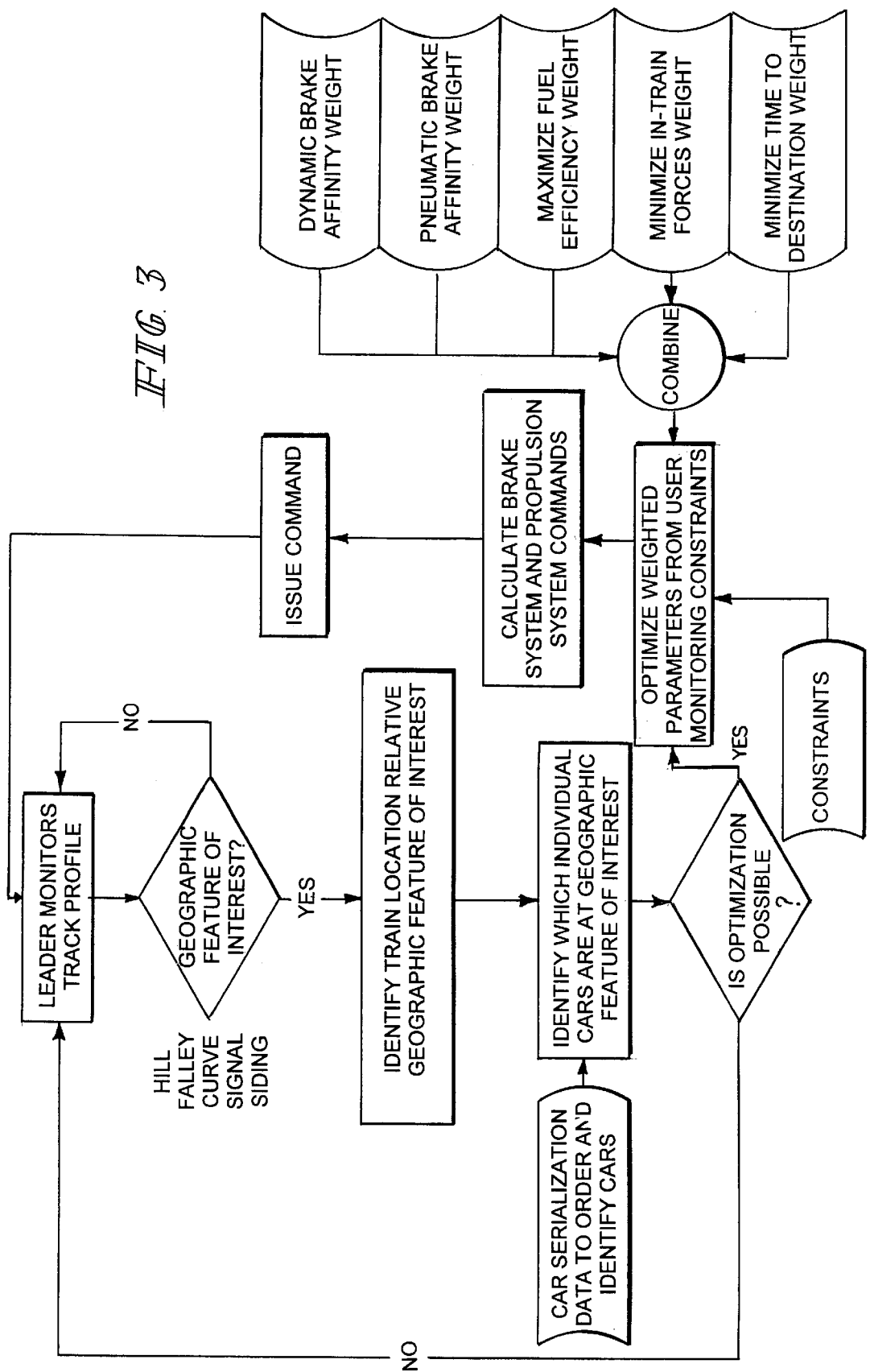
FIG. 3 is a flow chart for the control of braking and propulsion system car by car according to the principles of the present invention.

The control of the individual cars is illustrated in the flow chart of FIG. 3. The process begins with LEADER monitoring the track profile. If there is a geographic feature of interest, it proceeds to identify train location relative to geographic feature of interest. If not, it cycles back to monitoring the track profile. Geographic features of interest may include hills, valleys, curves, signals or siding. These are examples of features of interest which would benefit from individual car braking. After identifying the location of the train relative the geographic feature, the identity of which cars are at the geographic feature of interest is determined. This is determined using car serialization data to order and identify the cars. Serialization of the car may be determined using the process described in copending U.S. patent application ser. No. 08/837,113 filed Apr. 14, 1997 now U.S. Pat. No. 5,966,084.

After identifying the location of the car relative to the geographic feature of interest, there is a decision made of whether optimization is possible. If not, it cycles back to the LEADER monitoring track profile. If optimization is possible, the operating parameters for operational constraints are determined. As previously discussed, they may include limits on forces or speed. Next, optimized weighted parameters from the user are derived taking into account the operational constraints. Examples of method of optimization may be to maximize fuel efficiency, minimize in-train forces or minimize time to destination. Also, dynamic brake affinity and pneumatic brake affinity can be weighted also. These are determined by the user. These weighted factors are combined and provided to the optimized weighted parameter from user step. If less than all is desired, the weight for the undesired parameter may be given zero.

The optimized weighted parameters are then used to calculate optimized operating parameters, for example, which car to brake and what level of braking is necessary. The appropriate commands are issued to the electropneumatic system brakes of each car. This would include the car ID and level of braking transmitted over the communication link throughout the train. For the locomotives, this would include pneumatic and dynamic braking as well as propulsion.

If all of the cars are not equipped with EP system brakes, the only control of the train is through the brake pipe to the individual cars as well as the brakes and the throttle on the locomotive. Thus, maximization of fuel efficiency, minimizing the in-train forces and minimizes time to destination would have to be controlled through the throttle and brake pipe. If the cars do not have individually controlled brakes, the optimized operating parameters are determined on the system level as illustrated in FIG. 4.

Figure 4:
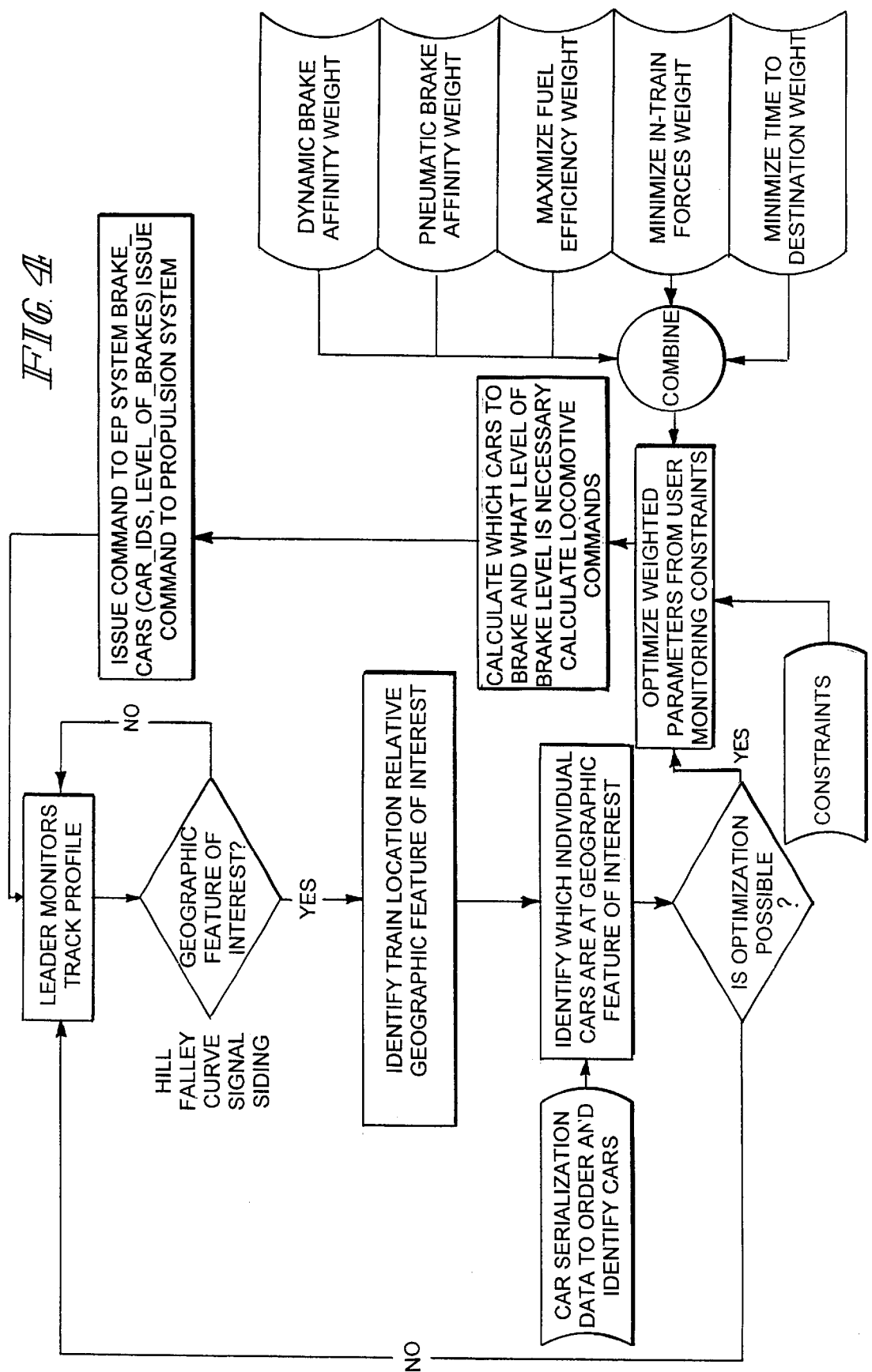
FIG. 4 is a flow chart for the control of the braking and propulsion system according to the principles of the present invention.

It should be noted that even if optimization may not be possible, the flow charts of FIGS. 3 and 4 would also be operable to identify the train location and the location of the individual cars and determine whether the constraint limits have been or are going to be reached. If there is an anticipation that they are going to be reached, then the calculation of restraint operating parameters are performed. The calculation of which cars to brake and what level of brake is necessary as well as calculation of locomotive commands is performed. These commands are then issued to the individual cars and locomotives. Alternatively, the braking and propulsion control is performed on the system level.

The calculations and the optimization of FIGS. 3 and 4 are conducted not only for the present location of the train but looking ahead at the ensuing track profile. This is used to determine what change in the train conditions will result from the change in the track profile and location. Without such look ahead capability, complete optimization is not fully achieved. Also, anticipation of a diminishing or increasing condition in track profile and train location will affect keeping the train within the constraint boundaries.

Proportional controls of the locomotive traction power and dynamic braking include subsystems for managing a locomotive pulling effect and electric braking efforts. Proportional control of locomotive air brake subsystems including both the application and release the independent locomotive brakes and the train or individual car brakes. The activation/deactivation of ancillary locomotive control systems include control of sanding, the horn and the bells.

Figure 8:
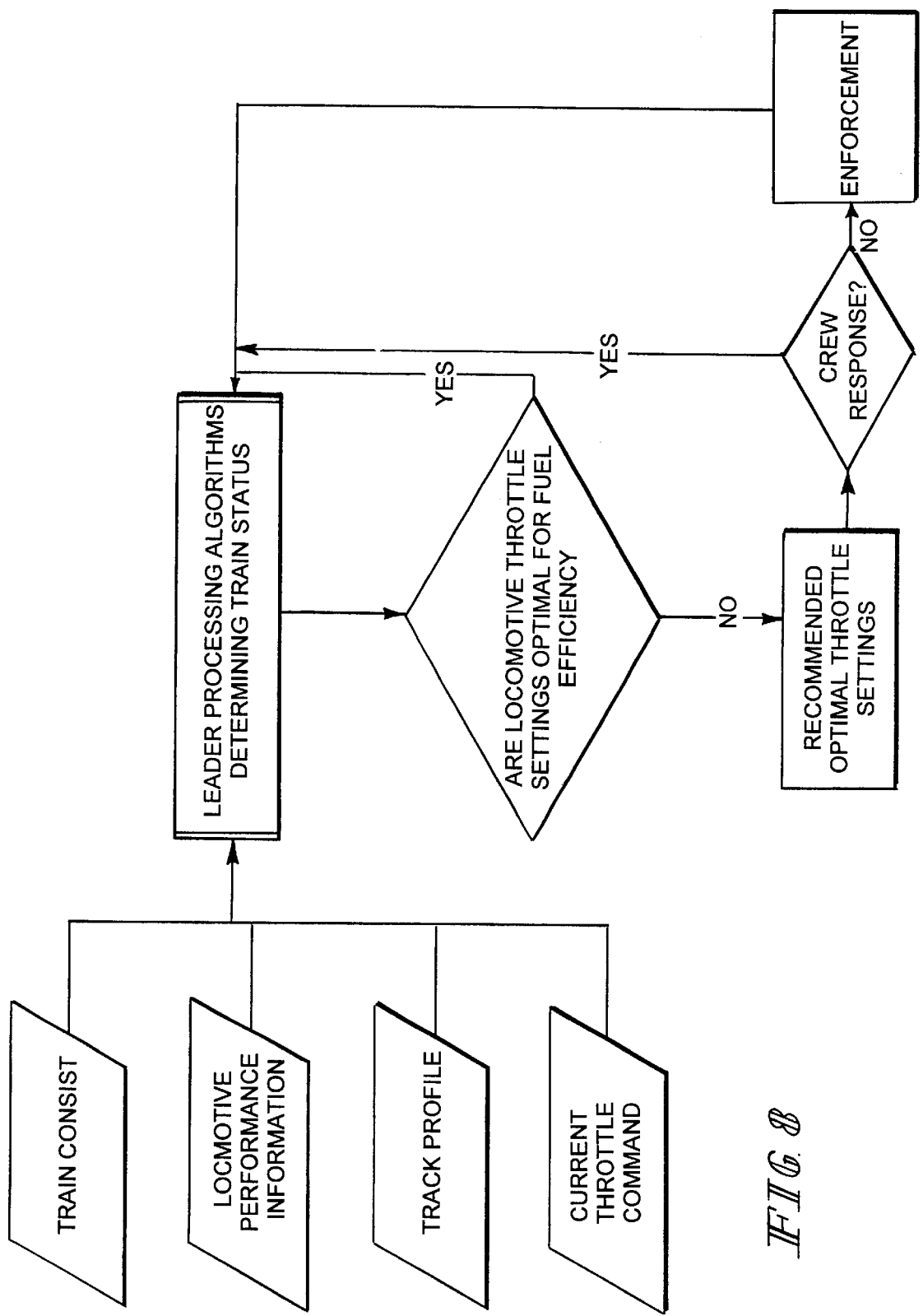
FIG. 8 is a flow chart for fuel optimization using throttle setting according to the principles of the present invention.

As a subset of the optimization of FIGS. 3 and 4 or as an independent system, fuel optimization through the throttle setting including idle is described in FIG. 8.

Locomotives operate at maximum efficiency at certain throttles. While multiple locomotives are necessary to pull the train over certain areas, other areas in the same territory may not require all of the locomotives for operation. LEADER has the knowledge of the state of the train currently, the locomotive capacity, the train consist and the track profile ahead. Using this knowledge, LEADER can determine the optimal combination of throttle settings on the locomotive to maximize efficiency. The setting can be from idle to notch 1–8.

Information on the train consist, locomotive information, track profile and current throttle commands are used by the LEADER processing algorithms to determine the train status. The determination is then made of whether the throttle settings are optimal for fuel efficiency. If they are, no further processing is required. If they are not, then a recommended optimal throttle setting is determined. This setting is then displayed to the crew. In a semiautomatic mode, the crew response is determined and if the crew selects the optimal setting, no further processing is performed. If the crew does not select the optimal setting, then the system will automatically select the optimal setting. Thus, fuel optimization through throttle setting is achieved.

As a further extension of optimization using throttle settings is the ability to save fuel through shutdown and restart of the locomotives. Over the course of operation of a freight train, for example, a coal train operating in a loop, a portion of the train's operating time is spent moving totally empty. The amount of power required during a loaded move will generally determine the number and horse power of the locomotives in the train. All trains are generally operated during both the loaded and empty move in such a train, even though the empty train movement may not require all of the locomotives from propulsion. The LEADER's capability to look ahead and calculate required horse power for a certain section of a move, it is possible to shutdown an unneeded locomotive and save sufficient fuel. The LEADER can continue to look ahead and determine whether and when additional power will be necessary. They command the engines to restart with proper warm up time to be available when required.

Figure 9:
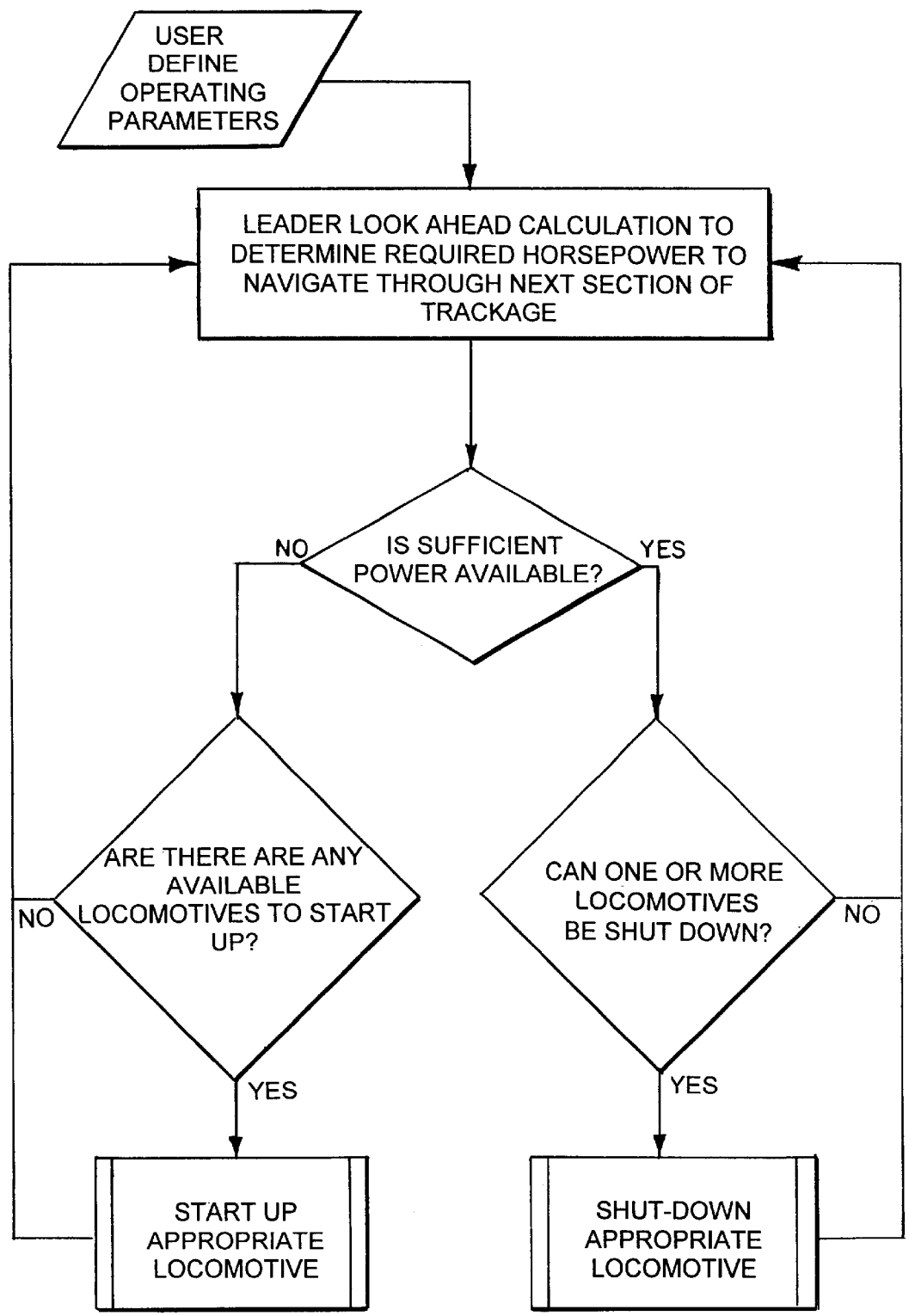
FIG. 9 is a flow chart for fuel savings using shutdown/restart of locomotives.

The flow chart for such an operation is illustrated in FIG. 9. User defined operating parameters are inputted to the LEADER system. The LEADER looks ahead to calculate or the determined required horse power to navigate through the next section of trackage. Then a determination is made whether sufficient power is available. If not, then there is a determination whether there are any available locomotives to start up. If not, the system cycles back to the beginning. If there is, then one or more of the available locomotives are started up to provide the appropriate horsepower. If sufficient horsepower is available, then a determination is made of whether one or more of the locomotives can be shutdown for the power requirement. If not, then the system cycles back. If one or more locomotives can be shutdown, then one or more locomotives are appropriately shutdown. This system is reiterated continuously monitoring the ensuing trackage and adjusting the number of locomotives which are shutdown or restarted.

Another limitation on the abilities to control the in-train forces and fuel efficiency is that on most trains, that although the freight brakes can be gradually applied, they cannot be gradually released. Once a brake is released by the locomotive engineers, the brake will completely release. After a brake application is initiated, it may take up to one minute or longer to fully apply the brakes throughout a train having, for example, 100 cars. A full release of a brake system will also take a minute or longer. The time required is depended upon the length of the train and the specific type of brake valves on the cars. Thus, a common problem faced by the locomotive engineers to determine the extent of brake to apply.

If an engineer is moving down a grade that requires a brake application to maintain a safe speed, a sufficient application must be made to prevent the train from gaining too much speed. If too much brake is applied, the train may slow down and eventually stop or stall. Ideally, sufficient brake is applied to balance the effect of the grade. If too much brake is applied, there are two choices. The brakes can be released and re-applied, which will take two or more minutes. This may result in the train gaining too much speed before the brakes are reapplied and therefore being a "runaway". The other alternative is to apply the locomotive power propulsion to compensate for the excessive brake application. This is known as "power braking". Although resulting in a reasonable control of train speed, it increased the cost of energy, fuel consumption and wear on the brake system.

The LEADER system measures train speed, time, track location and profile, locomotive throttle and brake control settings, and the train makeup determines the optimum brake application required to maintain a safe speed. The safe speed may be optimized in combination with a longitudinal and lateral force level, minimum slack action and fuel usage. Using standard freight train dynamic modeling coupled with the measurements and data bases, the LEADER predicts that brake control settings will be required to maintain the speed or to optimize the speed with other forces and fuel usage. Depending upon the mode of operation, the predicted brake settings can be conveyed to the LEADER display for implementation by the engineer or for control by the LEADER system directly.

Figure 10:
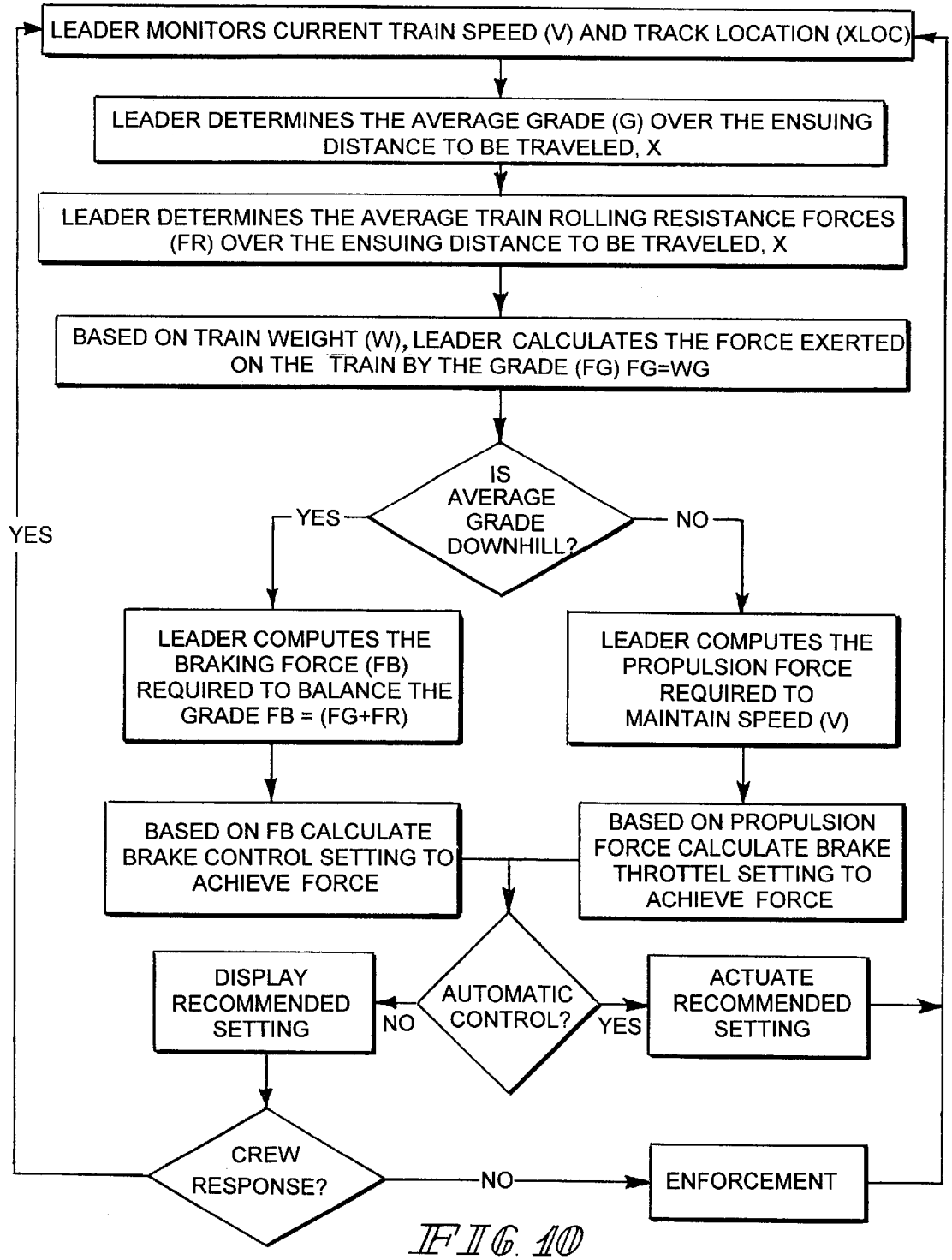
FIG. 10 is a flow chart for balancing grade according to the principles of the present invention.

A flow chart for optimizing the braking of the train to maintain grade is illustrated in FIG. 10. LEADER monitors current train speed (V) and track location (XLOC). LEADER determines the average grade (G) over the ensuing distance to be traveled, X. LEADER determines the average train rolling resistance forces (FR) over the ensuing distance to be traveled, X. Based on train weight (W), LEADER calculates the force exerted on the train by the grade (FG), FG=WG. If the average grade (G) is downhill, LEADER computes the braking force (FB) required to balance the grade (G), FB=(FG+FR). Based on the calculated brake force (FB) required, LEADER determines the brake control settings to achieve this brake force. If the average grade is not downhill, LEADER computes the propulsion force required to maintain the speed (V). Based on the propulsion force required to maintain speed, the LEADER calculates train throttle settings to achieve this force.

The control settings or the throttle settings required to achieve the force will then be used with a determination of whether there is automatic control. If automatic control is not selected, the settings are displayed. The determination is made of whether the crew responded to the displayed settings. If they do, then the system cycles back to the beginning. If not, an enforcement is produced. This enforcement could include a warning or automatic control. If automatic control is selected, then the appropriate settings are actuated. The balancing grade may also be part of the optimization routine of FIGS. 3, 4, 8 and/or 9.

Figure 11:
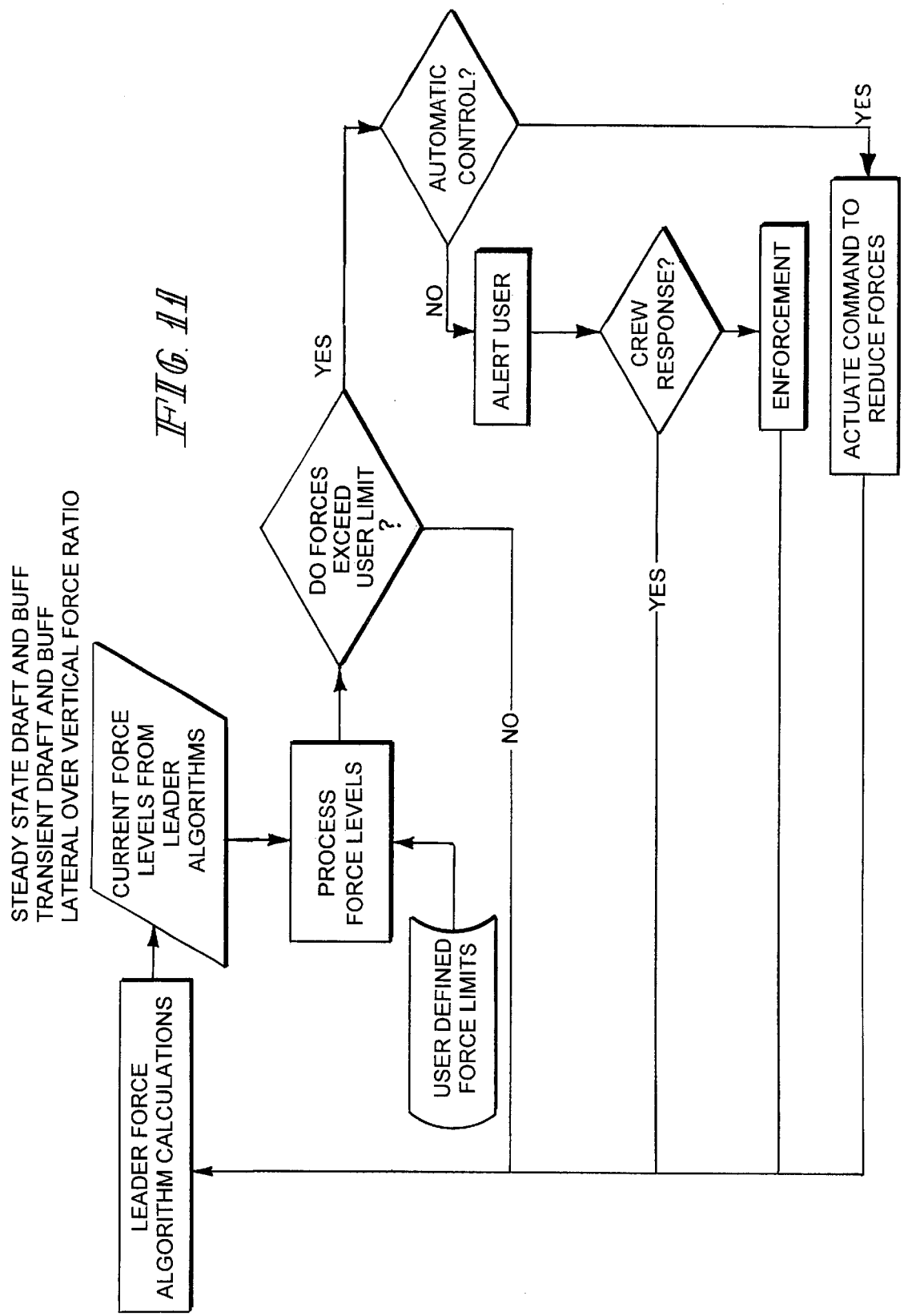
FIG. 11 is a flow chart for excessive force warning according to the principles of the present invention.

The longitudinal forces which, if they exceed the limit of the coupling system, will result in a train braking in-two. Pulling a long train up a grade against gravity and overcome the friction at the car axles, may produce an acceleration or force in the couplings which is unsafe. The determination of unsafe forces is described in the flow chart of FIG. 11. The LEADER determines the forces using its standard algorithms. The current force levels include steady state draft and buff, transient draft and buff and lateral over vertical force ratio. These are compared with the limits set by the railroad. If these calculated forces are outside the limits, the determination is then made whether the system is an automatic control or not. If it is an automatic control, then the commands to actuate forces are actuated. If it is not an automatic control, then an alert is provided to the user. The crew response is then determined. If the crew effectuates the required setting, then the system cycles back. If the crew does not actuate the required setting, then an enforcement is actuated. This enforcement again can be some visual alarm or indication or automatic control. If they are not outside the limits, the LEADER force calculation is continued.

Also, this information can be used as in the flow chart of FIGS. 3 and 4 as a weighted value or by itself to achieve optimum braking. It can be used to control the braking as well as to control the propulsion. By adjusting the propulsion system, pulling the force exerted can be controlled.

Figure 12:
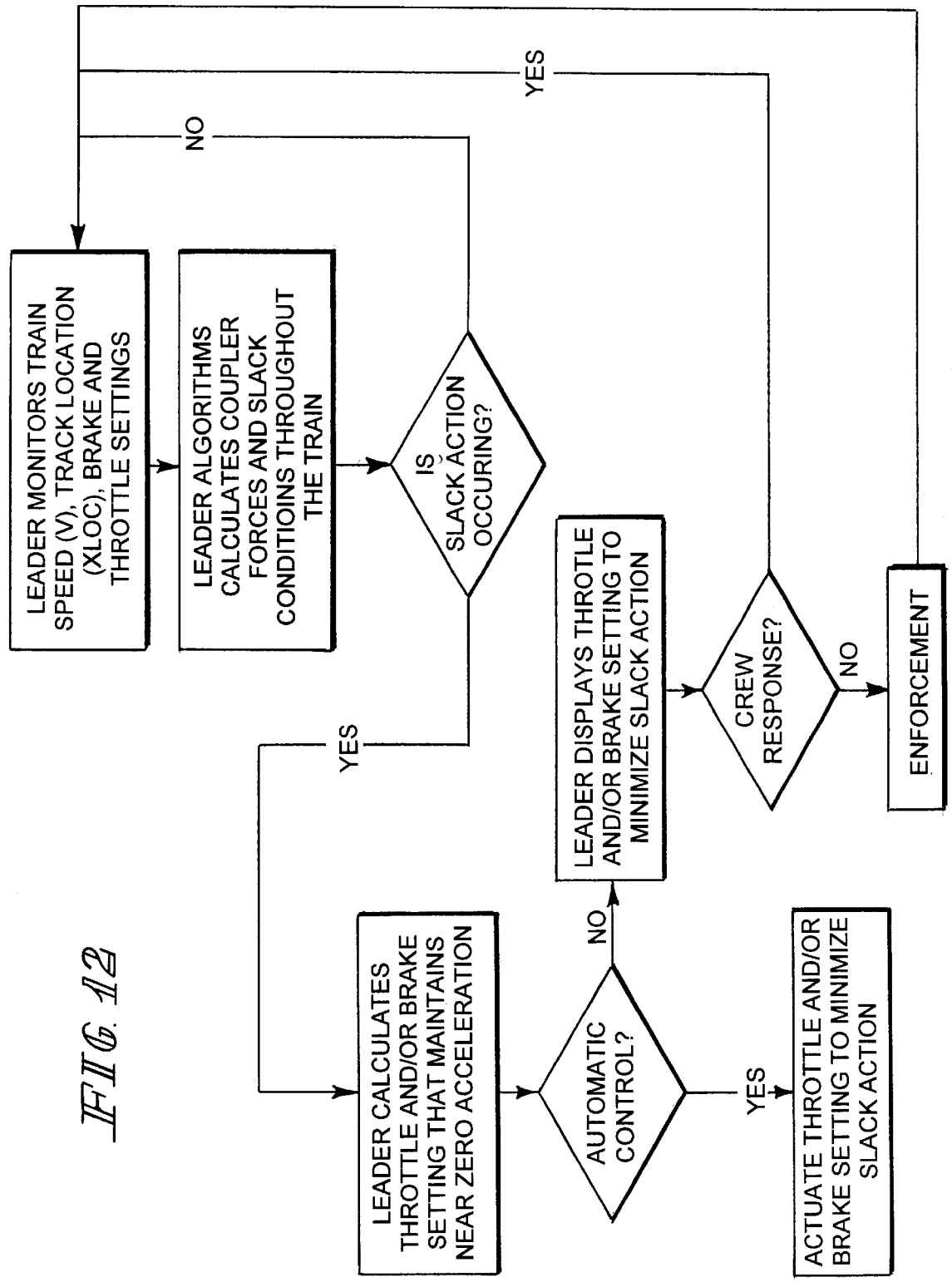
FIG. 12 is a flow chart for slack related force correction according to the principles of the present invention.

In addition to the coupling forces produced by the pulling between the cars, there is slack action which may brake the coupler or damage the coupling system. There is typically 4–6 inches of free unrestrained movement in the coupling and even at its relative speed of 1–2 miles an hour, can create large forces. The prediction and control of slack action is illustrated in the flow chart of FIG. 12. The LEADER measures train speed, time, track location and track profiles, locomotive throttle and brake settings and train make-up to minimize slack related forces. Using standard freight train dynamic modeling techniques, LEADER calculates coupler forces and slack conditions throughout the train. Next, it determines if slack action is occurring. If not, the existing throttle and brake settings are used in the display or for control of the train.

If slack action is occurring, coupled with the measurements and the stored data base information, the LEADER predicts the train and brake control settings that will minimize momentum changes between the freight cars. Through experimentation it has been discovered that the magnitude of slack related forces can be effectively minimized by maintaining near zero acceleration of the train as the slack action is occurring. The LEADER determines the magnitude of locomotive power application or brake system application that is required to maintain near zero train acceleration.

Next to determination is whether automatic control is actuated. If it is, then the throttle end are actuated to the calculated settings to minimize slack action. If not, the LEADER displays a throttle and/or brake settings to minimize slack action. Next, the crew's response is measured. If the crew sets the throttle and/or brakes to the desired setting, then the system cycles back to the beginning. If not, an enforcement is initiated. Again, this may be an alarm or indicator that they have not responded or it may automatic control.

Calculation control settings can either be conveyed to the locomotive engineer by the LEADER display for implementation or complete control settings can be set. Trains having some or all EP brake cars, slack action will be controlled either at the locomotive only with propulsion and brake pipe braking or in combination with EP braking on the individual cars by sending additional electrical signals to the individual cars to even out the slack within the consist.

In addition to providing information or controlling the train to be within speed limits, or to optimize the performance of the train, it is also important to provide information with respect to the ability to come to a safe stop. The LEADER system uses the measurement of train speed, time, track location and characteristics, locomotive throttle and brake control settings and car consist information to determine what is required to stop the train from its current track location. The LEADER uses standard freight train dynamic modeling techniques, coupled with the measurements in data base to accurately predict the distance required to stop the train from its present track location. The predicted stop distance can be conveyed to the locomotive engineer and the LEADER display and to ancillary control equipment of systems internal or external to the locomotive. If the predicted stop distance indicates that the locomotive will enter a restricted zone unless a stop is initiated, the ancillary control equipment can automatically induce the required brake application to bring the train to a safe stop.

Figure 13:
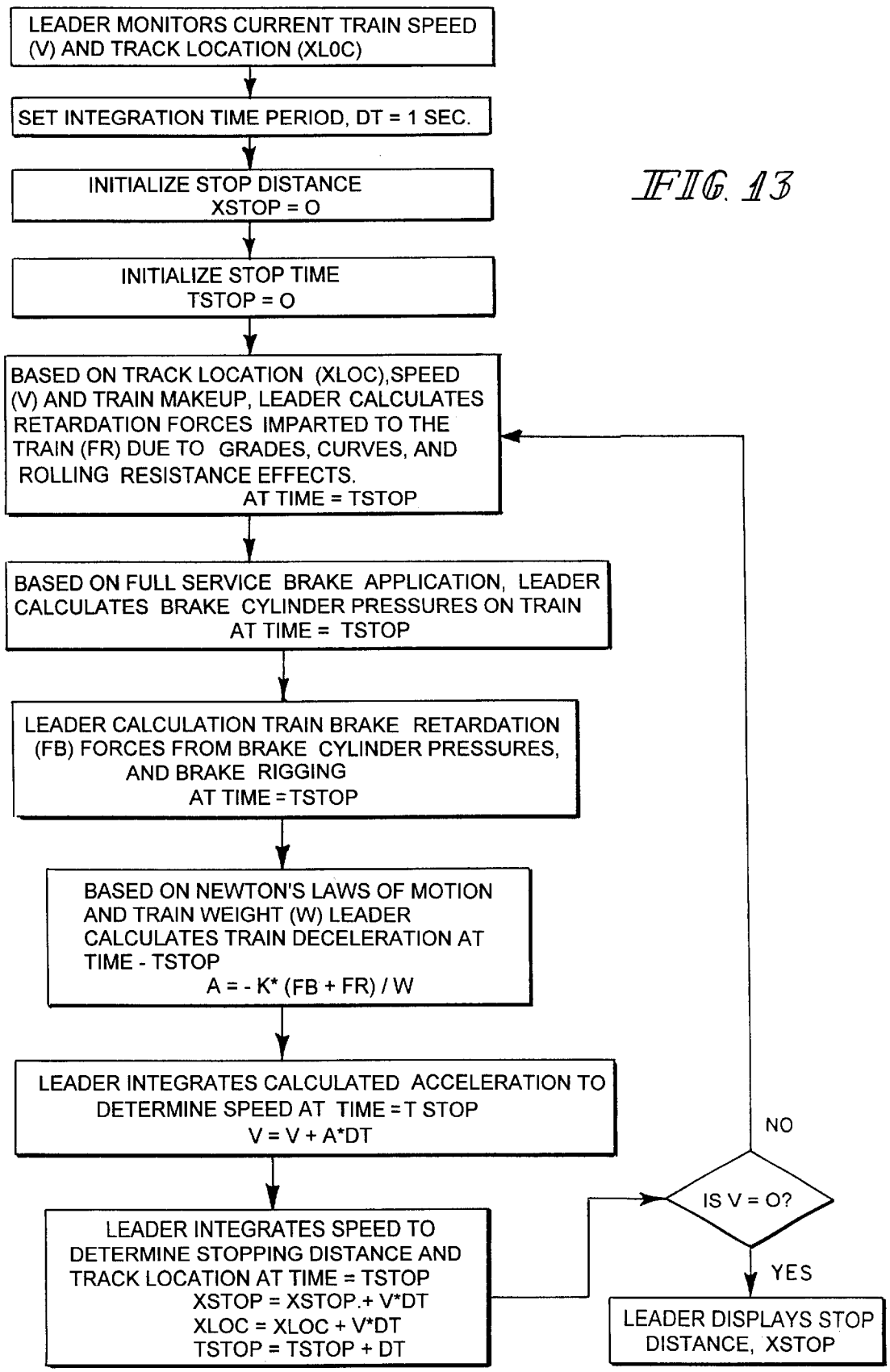
FIG. 13 is a flow chart for stop distance calculation according to the principles of the present invention.

FIG. 13 shows a flow chart for stop distance calculations. LEADER monitors current train speed (V) and track location (XLOC). It sets integration time period, DT=1 sec, initialize stop distance, XSTOP=0 and initialize stop time, TSTOP=0. Based on track location (XLOC), speed (V) and train makeup, LEADER calculates retardation forces imparted to the train (FR) due to grades, curves, and rolling resistance effects, at Time=TSTOP. Based on full service brake application, LEADER calculates brake cylinder pressures on train, at Time=TSTOP. LEADER calculation train brake retardation (FB) forces from brake cylinder pressures, and car brake rigging, at Time=TSTOP. Based on Newton's laws of motion and train weight (W), LEADER calculates train deceleration at time=TSTOP, A=K* (FB+FR)/W. LEADER integrates calculated acceleration to determine speed at time=TSTOP, V=V+A*DT. LEADER integrates speed to determine stopping distance and track location at time=TSTOP, XSTOP=XSTOP+V*DT. XLOC=XLOC+V*DT. TSTOP=TSTOP+DT. Next, it is determined if velocity V=0. If yes, LEADER displays stop distance XSTOP. If not, it loops back to begin the calculation cycle.

Figure 14:
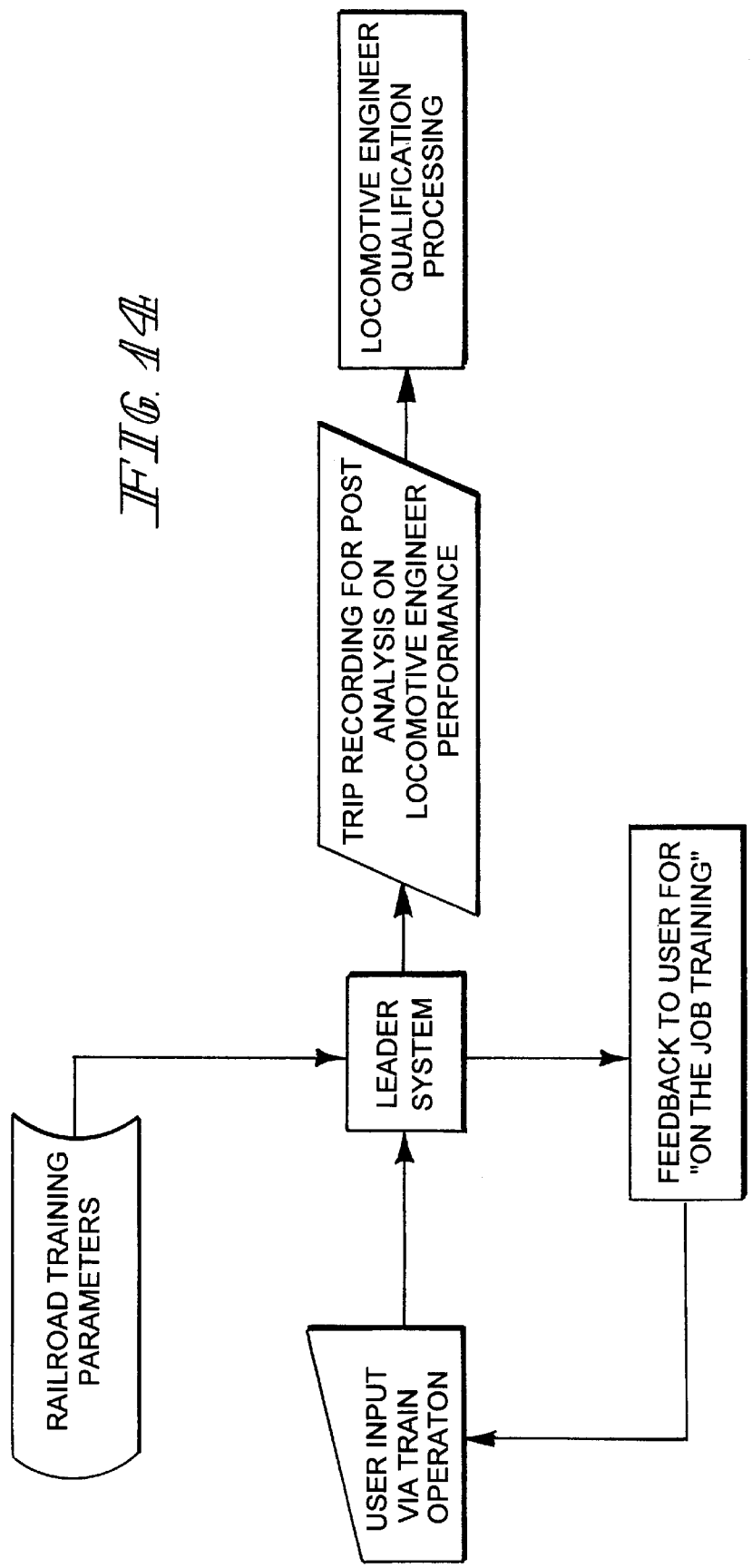
FIG. 14 is a flow chart for on job training/qualification according to the principles of the present invention according to the principles of the present invention.

The ability of the LEADER to provide information and to record information on the train allows the training or qualifying of the locomotive engineer. As illustrated in FIG. 14, training can be performed by providing railroad training parameters to the LEADER system. These training parameters include train-handling techniques such as speed regulation, in-train force management, proper use of air and dynamic brakes, adherence to signal aspect, and recognition and adherence to operational orders. Critical to making the correct judgement of crew performance is the understanding of current circumstances faced by the crews. LEADER uses and records actual locomotive status data to fully recreate the situations crews are faced with.

The LEADER system can provide feedback display information to the LEADER display screen for guidelines of operation. These guidelines of operation include recommended throttle and brake settings, blowing the whistle and bell for crossings (when not to blow the whistle for noise abatement purposes), and calling out signals. The conditions throughout the train may be displayed as shown in FIG. 5. The response of the engineer would then be recorded by the LEADER system. The LEADER system would then determine and display the conditions throughout the train resulting from the engineer's response.

Suggested corrections, responses or modifications to achieve a goal are calculated and displayed by the Leader system. A goal or desired response is determined by the training authority by selecting a combination of weighting or emphasis factors for maximizing fuel efficiency, minimizing time to destination and minimizing in-train forces or any of the other criteria using for example the processes of FIGS. 8–13. The desired response is displayed after determining the engineer's response. The desired response includes brake and/or propulsion settings. The display can be changed to reflect the condition resulting from the suggested response so the engineer can compare it to the conditions resulting from his response.

Another method of training a locomotive engineer in a moving train includes determining the actual conditions throughout the train. Brake and propulsion settings to achieve a goal are determined and displayed by the Leader system. The calculated brake and propulsion settings are displayed to the engineer and/or trainer on the train. The training authority forms a goal by selecting a combination of weighting or emphasis factors for maximizing fuel efficiency, minimizing time to destination and minimizing in-train forces. The engineer is qualified from a comparison of actual throttle and brake settings to a calculated set of recommended brake and throttle settings found to achieve the selected goal representing safe and efficient train-handling practices. The engineer may also be judged on when the whistle and bell were used in relation to crossings and whether speed was prudent for the operation of the train given current and anticipated circumstances. The train's present conditions throughout the train may be displayed as well as a change of the conditions throughout the train if the recommended throttle and brake settings would have been set.

The engineer's response is recorded as it relates to the train's conditions, for example as a function of time and/or location of the train. The suggested response or settings are also recorded if determined or used in the onboard training or determined during a post analysis. The engineer's response is compared to the designed response. The engineer is qualified from the comparison of the engineer's response to the desired response to the train conditions. For example, the engineer is qualified from a comparison of actual throttle and brake settings to the calculated throttle and brake settings.

A method of qualifying a locomotive engineer in a moving train includes recording on the moving train in a data storage the actual conditions throughout the train and the actual throttle and brake settings as a function of time. Throttle and brake settings based on the conditions of the train to achieve a goal are determined as a function of time and the engineer is qualified from a comparison of the actual throttle and brake settings to the determined throttle and brake settings determined by a railroad to represent safe and efficient train handling as a function of time. Also the observations of a trainer on the train is recorded as a function of time in the data storage and used for analysis and qualification.

During the evaluation period of a locomotive engineer as new trainee or the recertification of an experience engineer, a trainer may ride with the engineer to evaluate their performance. In a locomotive with an existing LEADER display, an input device used by the trainer can be connected to the display via a cable harness. In a locomotive without a LEADER, an input device can be connected to the Event Recorder. The input device can add additional parameters to the LEADER recorded data stream for post analysis and evaluation of the trainee's ability. Input parameters can include but are not limited to:

Signal Aspect

Voice Recording

Voice Radio Usage

Exact location of track structure

Instrument usage not recorded by LEADER

Text notes on how various situations are addressed (adherence to policy/rule adherence)

Text notes on situational awareness

By supplementing the LEADER recorded data with this type of additional information, the instructor or trainer can make specific entries, which will be available during a playback session. All entries can be correlated to time and location of the train and enhance the trainers ability to evaluate the trainees skills. Further, a permanent record can be created and stored for each trainee. Analysis of the data captured by LEADER will create a more objective qualification criteria for the trainee and provide feedback as to what categories a trainee needs improvement.

The LEADER system also has the ability to store the history of the trip and the operator's responses. This information can be downloaded and used on a simulator, desktop or portable PC system. This information can be compared against desired responses to qualify the engineer. Although such qualifications have historically been performed on training systems, the real life data provides a better setting for qualification. This information may also be used for train handling, performance analysis, accident investigation and general operational studies. The calculating of throttle and brake settings to achieve a goal may be performed on or off the train. The data storage maybe an event recorder already on the train or a Leader system.

The calculating and displaying steps may be performed on a portable computer on the train or a pre-existing computer on the train. A portable training system for training a locomotive engineer in a moving train includes an input for receiving information of the actual conditions of the train and a program for determining throttle and brake settings based on the present actual conditions of the train to achieve a goal. A display displays on the train the desired throttle and brake settings. As shown in FIG. 2 the laptop PC may have the training program and be connected to the Leader processor and/or directly to the I/O concentrator, as shown by the dashed line. The display may be part of the portable system or mounted to the train, for example the Leader display, and the portable system has an output coupled to the display.

An engineer training on a simulator can only improve to a certain level. If the engineer practices on the same course, they train to that course. Like a video game, they learn or memorize the course and thus have limited training to handle other courses and situations. Also, the simulators do not simulate the full environment of an actual train. Engineers take in a lot of information from their senses other than vision. The sound of the engines, slack action, track noise are sensed and interpreted. The motion of slack action, acceleration/deceleration and track motions are also sensed and interpreted. By training with the LEADER system on the train, the engineer reacts to live, continuously changing, non-predictable conditions. Not only would the conditions be changed in the weather, but also the make up of the train and the loads of the individual cars.

The result to the train's dynamic of the engineer's response are not only displayed by LEADER display, the engineer also gets the actual feedback to the eyes, ears and motion senses. Since the response produces actual results in the train, the training is not a game which can be stopped if the response would produce a dangerous condition. A training run is longer than a training session on a simulator. The LEADER display offers a visual display of train dynamics to allow self instruction or instruction by a trainer on board.

Figure 15:
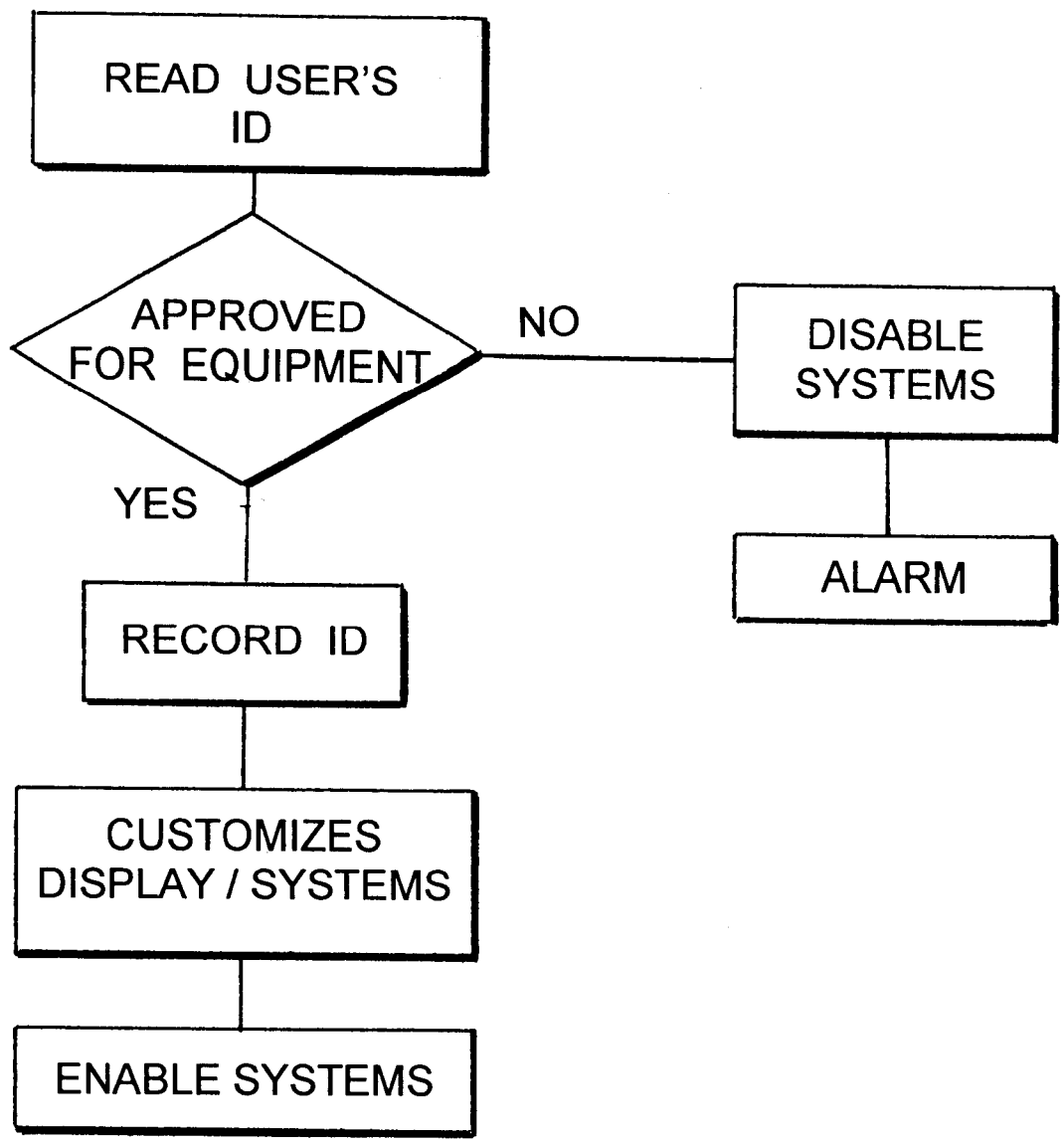
FIG. 15 is a flow chart for controlling access to the locomotive controls according to the present invention.

Access to the control of the locomotives may be determined by reading a user I.D. and determining whether the user is qualified to use the particular piece of equipment. This information may be on an encoded device which the user of the locomotive must insert into the system before the system will be actuated. A flow chart of the system is illustrated in FIG. 15. The user's I.D. is read. A determination is then made whether the user, through his I.D. or through his qualification level is approved for the particular equipment or locomotive. If the engineer is not, the system is disabled. An alarm may be set if desired. If the engineer is qualified or approved for the equipment, the user I.D. is recorded. The display and/or systems could be customized for that user if desired. If not, this step can be deleted. The final step for an improved user is to enable the systems for its use.

The encoded device which includes the user's I.D. and their qualification may also be used with the trainer of FIG. 14. This training session would determine, from the user I.D., their level prior to the training session. Depending upon the results and the qualification, this user's level would be updated. Thus, the encoded device would always carry the latest qualification level of the user.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of training a locomotive engineer in a moving train comprising:

determining and displaying actual conditions throughout the train;

determining engineer's response to the actual condition; and determining and displaying on the train the actual conditions throughout the train resulting from the engineer's response.

2. The method according to claim 2, including calculating a desired response to the actual conditions of the train to achieve a goal.

3. The method according to claim 2, wherein the goal is selected from minimizing train forces, maximizing fuel efficiency and minimizing time to destination.

4. The method according to claim 2, including displaying the desired response after determining the engineer's response.

5. The method according to claim 2, wherein the desired response includes brake and propulsion settings.

6. The method according to claim 2, wherein the display is changed to reflect the conditions of the train resulting from the desired response.

7. The method according to claim 2, including qualifying the engineer from a comparison of the engineer's response to the desired response as a function of time.

8. The method according to claim 2 including determining the qualification level of the engineer prior to training from the engineer's inputs, qualifying the engineer based on the determined response and updating the qualification level.

9. The method according to claim 1, including recording the actual conditions of the train and engineer's response as a function of time in a data storage.

10. The method according to claim 9, including calculating a desired response to the actual conditions of the train and recording the desired response as a function of time in the data storage.

11. The method according to claim 9, including recording observations of a trainer on the train as a function of time in the data storage.

12. The method according to claim 1, wherein determining the actual conditions throughout the train includes determining conditions of location, track profile and train forces throughout the train.

13. The method according to claim 12, wherein determining train forces includes determining forces experienced by and through out the train for ensuing track profile.

14. A method of training a locomotive engineer in a moving train comprising:
   determining actual conditions throughout the train;
   calculating throttle and brake settings based on the actual conditions throughout the train to achieve a goal; and
   displaying on the train the calculated throttle and brake settings.

15. The method according to claim 14, including qualifying the engineer from a comparison of actual throttle and brake settings to the calculated throttle and brake settings as a function of time.

16. The method according to claim 14, wherein the goal is selected from minimizing in train forces, fuel consumption and time to destination.

17. The method according to claim 14, including displaying on the train the conditions throughout the train and displaying change of the conditions throughout the train if the calculated throttle and brake settings were set.

18. The method according to claim 14, wherein determining the actual conditions throughout the train includes determining conditions of location, track profile and train forces throughout the train.

19. The method according to claim 14, wherein the calculating and displaying are performed on a portable computer on the train.

20. A method of qualifying a locomotive engineer in a moving train comprising:
   recording on the moving train in a data storage actual conditions throughout the train as function of time;
   recording actual throttle and brake settings as a function of time in the storage;
   observing by a trainer on the train of parameters relating to qualifying the engineer; and
   recording the observations of the trainer as a function of time in the data storage.

21. The method according to claim 20, including calculating throttle and brake settings based on the actual conditions of the train to achieve a goal as a function of time; and qualifying the engineer from a comparison of the actual throttle and brake settings to the calculated throttle and brake settings as a function of time.

22. The method according to claim 20, wherein the calculating of throttle and brake settings to achieve a goal is performed on or off the train.

23. The method according to claim 20, wherein the data storage is an event recorder on the train.

24. The method according to claim 20, wherein the recorded observations includes one or more of: signal aspect, exact location of track structure, instrument usage, adherence to policy and rules and situational awareness.

25. The method according to claim 20 including recording the use of whistle and bell.

26. A portable training system for training a locomotive engineer in a moving train comprising:
   an input for receiving information of actual conditions throughout the train;
   a program for calculating throttle and brake settings based on the actual conditions throughout the train to achieve a goal; and
   a display for displaying on the train the calculated throttle and brake settings.

27. The system according to claim 26, wherein the display is mounted to the train and the portable system has an output coupled to the display.

* * * * *

UNITED STATES PATENT AND TRADEMARK OFFICE
CERTIFICATE OF CORRECTION

PATENT NO.    : 6,263,266 B1
DATED         : July 17, 2001
INVENTOR(S)   : Michael J. Hawthorne It is certified that error appears in the above-identified patent and that said Letters Patent is hereby corrected as shown below:

<u>Column 4,</u>
Line 57, change "FIG. 3" to -- FIG. 4 --.
Line 60, change "FIG. 4" to -- FIG. 3 --.

<u>Column 11,</u>
Line 16, change "FIG. 3" to -- FIG. 4 --.
Line 64, change "FIG. 4" to -- FIG. 3 --.

Signed and Sealed this

Sixteenth Day of July, 2002

Attest:

JAMES E. ROGAN
Attesting Officer     Director of the United States Patent and Trademark Office